(12) United States Patent
Zhang et al.

(10) Patent No.: US 11,777,689 B2
(45) Date of Patent: Oct. 3, 2023

(54) METHOD AND DEVICE FOR PROCESSING CONFIRMATION INFORMATION

(71) Applicant: ZTE CORPORATION, Shenzhen (CN)

(72) Inventors: Wanchun Zhang, Shenzhen (CN); Wei Gou, Shenzhen (CN); Feng Bi, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 630 days.

(21) Appl. No.: 16/474,773

(22) PCT Filed: Dec. 26, 2017

(86) PCT No.: PCT/CN2017/118498
§ 371 (c)(1),
(2) Date: Jun. 28, 2019

(87) PCT Pub. No.: WO2018/121500
PCT Pub. Date: Jul. 5, 2018

(65) Prior Publication Data
US 2019/0342055 A1  Nov. 7, 2019

(30) Foreign Application Priority Data

Dec. 30, 2016  (CN) .......................... 201611260104.1
May 5, 2017  (CN) .......................... 201710317004.6

(51) Int. Cl.
*H04L 5/00* (2006.01)
*H04L 1/1812* (2023.01)
*H04L 1/1829* (2023.01)

(52) U.S. Cl.
CPC .......... *H04L 5/0055* (2013.01); *H04L 1/1812* (2013.01); *H04L 1/1864* (2013.01)

(58) Field of Classification Search
CPC ... H04L 5/0055; H04L 1/1812; H04L 1/1864; H04L 1/1614; H04L 1/1861; H04L 1/1893; H04L 1/1896; H04L 1/1607
See application file for complete search history.

(56) References Cited

U.S. PATENT DOCUMENTS 8,243,672 B2 * 8/2012 Park .................... H04W 72/042
                                                              370/329
10,673,594 B2 * 6/2020 Chen .................... H04W 72/042
(Continued)

FOREIGN PATENT DOCUMENTS

CN        101615986 A        12/2009
CN        102484568 A         5/2012
(Continued)

OTHER PUBLICATIONS

European Patent Office, Extended European Search Report dated Dec. 9, 2019 for EP17889228.7.
(Continued)

*Primary Examiner* — Kibrom T Hailu
(74) *Attorney, Agent, or Firm* — Li & Cai Intellectual Property (USA) Office

(57) ABSTRACT

Provided by the present disclosure are a method and apparatus for processing confirmation information. The method includes: transmitting, by a transmitting end, a signaling, wherein the signaling is configured to instruct a receiving end to generate confirmation information corresponding to one-time data transmission according to the signaling and in combination with a pre-agreed implicit rule; and receiving, by the transmitting end, the confirmation information, and parsing the confirmation information according to the signaling and in combination with the pre-agreed implicit rule.

20 Claims, 5 Drawing Sheets

```
A transmitting terminal sends a signaling, the signaling being
used for instructing a receiving terminal to generate,
according to the signaling, confirmation information             S202
corresponding to one-time data transmission in combination
with a pre-arranged implicit rule

↓

The transmitting terminal receives the confirmation
information and analyzes, according to the signaling, the        S204
confirmation information in combination with the
pre-arranged implicit rule
```

(56) References Cited

U.S. PATENT DOCUMENTS

| | | | |
|---|---|---|---|
| 2015/0207595 A1* | 7/2015 | Oizumi | H04L 1/1861 |
| | | | 370/329 |
| 2016/0226643 A1 | 8/2016 | Mallik et al. | |
| 2016/0353443 A1* | 12/2016 | Desai | H04L 5/0092 |
| 2019/0165893 A1* | 5/2019 | Khosravirad | H03M 13/6306 |
| 2019/0363832 A1* | 11/2019 | Yang | H04L 1/18 |

FOREIGN PATENT DOCUMENTS

| | | |
|---|---|---|
| CN | 106888074 A | 6/2017 |
| CN | 107070625 A | 8/2017 |
| CN | 107359970 A | 11/2017 |
| EP | 2413627 A1 | 2/2012 |
| WO | WO 2015184919 A1 | 12/2015 |

OTHER PUBLICATIONS

Anonymous, "CBG based HARQ-Ack/Nack," 3GPP TSG RAN WG1 NR Ad-Hoc#2 Agenda, Jun. 27-30, 2017. 6 pages.

* cited by examiner

METHOD AND DEVICE FOR PROCESSING CONFIRMATION INFORMATION

CROSS-REFERENCE TO RELATED APPLICATIONS

The present disclosure is a continuation application, under 35 U.S.C. § 371, of PCT Application No. PCT/CN2017/118498, filed Oct. 26, 2017, which is based upon and claims priority to Chinese Patent Application 201611260104.1, filed Dec. 30, 2016 and Chinese Patent Application 201710317004.6, filed May 5, 2017, the entire contents of which are incorporated herein by reference as part of this application.

TECHNICAL FIELD

The present disclosure relates to the field of communications, and more particularly, to a method and apparatus for processing confirmation information.

BACKGROUND

A new generation system for mobile communication (New Radio, NR for short) is being researched and standardized, which is also one of the key points of work in 3GPP at present.

There will be three typical types of services in the future among the NR systems that can be determined currently. Common services include: enhanced Mobile BroadBand (eMBB), Ultra-Reliable and Low Latency Communications (URLLC) and massive Machine Type Communications (mMTC). These services have different requirements on delay, coverage and reliability. For example, the eMBB mainly focuses on high peak transmission rates, has low requirements on the delay (no requirements on low delay), and has moderate requirements on reliability. The URLLC emphasizes on low delay and high reliability transmission, and has very severe requirements on delay. The mMTC places stress on a large number of terminals, large connection density, and large transmission coverage, and almost has no requirements on delay.

The followings are some radio data and control structures designed for the fifth generation of wireless communication technology (5G). FIG. 1 is a schematic structural diagram of a transmission unit in the early technical discussion of the NR. As shown in FIG. 1, it can be deemed as a basic transmission unit, such as a transmission time interval (TTI) composed of multiple orthogonal frequency-division multiplexing (OFDM) symbols, or a subframe composed of multiple TTIs. Downlink control refers to control information related to downlink data transmitted by a base station to a user equipment (UE); a Guard Period (GP) is used to achieve a time for switching between receiving/transmitting states; the uplink data refers to data transmitted by the UE to the base station; and uplink control refers to information needing to be transmitted by the UE needs to the base station excluding the uplink data, such as ACK/NACK feedback information about downlink data receiving, channel state information, scheduling request, etc., transmitted by the UE to the base station.

Aggregation is allowed between such basic transmission units, i.e., multiple basic units are connected in series as a longer transmission unit for data transmission.

Moreover, new encoding and decoding modes are discussed and are likely to be introduced in the NR. In this manner, a receiving end is allowed to decode according to OFDM symbols received, i.e., decoding one OFDM symbol once one OFDM is received. This is a "streaming" decoding mode, which is mainly for accelerating the receiving end to feed back confirmation information to a transmitting end after the receiving end receives data of the last OFDM symbol transmitted in this time. Obviously, this "streaming" decoding achieves the above purpose of quickly feeding back the confirmation information.

However, for the decoding mode above, some better confirmation information feedback should also be studied, so that the receiving end can accurately feed back which part of data is erroneous as much as possible, rather than the situation that one piece of confirmation information is fed back with respect to one transmission block at current, and in case of any mistake, it is not clear which part of data is wrong. In this way, the transmitting end has to transmit the entire transmission block once again.

In the related art, no effective solutions have been proposed regarding the problem of low accuracy on locating the erroneous data caused by a feedback mechanism that one confirmation information is fed back with respect to one transmission block.

This section provides background information related to the present disclosure which is not necessarily prior art.

SUMMARY

The embodiments of the present disclosure provide a method and apparatus for processing confirmation information, so as to at least solve the problem in the related art that the accuracy of locating the erroneous data is low due to the feedback mechanism that one piece of confirmation information is fed back with respect to one transmission block.

According to an embodiment of the present disclosure, there is provided a method for processing confirmation information, including: transmitting, by a transmitting end, a signaling, wherein the signaling is configured to instruct a receiving end to generate confirmation information corresponding to one-time data transmission according to the signaling and in combination with a pre-agreed implicit rule; and receiving the confirmation information and parsing the confirmation information according to the signaling and in combination with the pre-agreed implicit rule, by the transmitting end.

Optionally, the transmitting, by the transmitting end, the signaling includes: transmitting, by the transmitting end, a first signaling, wherein the first signaling is configured to instruct the receiving end to generate a number of the confirmation information or a number of a granularity corresponding to one-time data transmission; and/or transmitting, by the transmitting end, a second signaling, wherein the second signaling is configured to indicate a granularity used by the receiving end for generating the confirmation information corresponding to the one-time data transmission of the transmitting end; and wherein the granularity includes at least one of followings: an Orthogonal Frequency Division Multiplexing (OFDM) symbol, an Orthogonal Frequency Division Multiplexing (OFDM) symbol group, a Code Block (CB), a Code Block Group (CBG), a mini-slot, a mini-slot group, a slot, a slot group, and a transmission block.

Optionally, the implicit rule includes: in the case that the transmitting end transmits the first signaling, for one-time data transmission in one or more slots, the receiving end being instructed to determine a quantity of units corresponding to each confirmation information according to a quantity of units of transmitted data transmitted in one or more slots and the number of the confirmation information or the number of the granularity, so as to form the confirmation information; and instructing, by the transmitting end, the receiving end, or pre-agreeing by the transmitting end and the receiving end, to form one confirmation information for each granularity, wherein the unit includes at least one of followings: an OFDM symbol, an OFDM symbol group, a CB, a CBG, a mini-slot, a mini-slot group, a slot, a slot group, and a transmission block.

Optionally, when a quotient between the quantity of units of the transmitted data and the number of the confirmation information or the number of the granularity is an integer, the receiving end takes the quotient as the quantity of units corresponding to each confirmation information or each granularity; and according to the quantity of units corresponding to each confirmation information or each granularity, the confirmation information is formed sequentially corresponding to each confirmation information or each granularity corresponding to individual units in the transmitted data from front to back or from back to front.

Optionally, when a quotient between the quantity of units of the transmitted data and the number of the confirmation information or the number of the granularity is not an integer, the receiving end rounds up the quotient to obtain a first value; a quantity of units in the transmitted data corresponding to a part of the confirmation information or a part of the granularity is equal to the first value; the confirmation information or granularity with a smaller quantity of units in the transmitted data is located at an end position or an initial position of all the confirmation information or granularity; the receiving end forms the confirmation information sequentially corresponding to individual units in the transmitted data from front to back according to the first value, wherein a quantity of units corresponding to the last confirmation information is smaller than the first value, and the last confirmation information is located at an end position of the transmitted data; or, the receiving end forms the confirmation information sequentially corresponding to individual units in the transmitted data from back to front according to the first value, wherein a quantity of units corresponding to the first confirmation information is smaller than the first value, and the first confirmation information is located at an initial position of the transmitted data.

Optionally, when a quotient between the quantity of units of the transmitted data and the number of the confirmation information or the number of the granularity is not an integer, the receiving end rounds down the quotient to obtain a second value; a quantity of units in the transmitted data corresponding to a part of the confirmation information or a part of the granularity is equal to the second value; the confirmation information or granularity with a larger quantity of units in the transmitted data is located at an end position or an initial position of all the confirmation information or granularity; the receiving end forms the confirmation information sequentially corresponding to individual units in the transmitted data from front to back according to the second value, wherein a quantity of units corresponding to the last confirmation information is greater than the second value, and the last confirmation information is located at an end position of the transmitted data; or, the receiving end forms the confirmation information sequentially corresponding to individual units in the transmitted data from back to front according to the second value, wherein a quantity of units corresponding to the first confirmation information is greater than the second value, and the first confirmation information is located at an initial position of the transmitted data.

Optionally, when a quotient between the quantity of units of the transmitted data and the number of the confirmation information or the number of the granularity is not an integer, the receiving end rounds down the quotient to obtain a third value, and adds 1 to the number of the confirmation information or the number of the granularity; the receiving end forms the confirmation information sequentially corresponding to individual units in the transmitted data from front to back according to the third value, wherein a quantity of units corresponding to the last confirmation information is smaller than the third value, and the last confirmation information is located at an end position of the transmitted data; or, the receiving end forms the confirmation information sequentially corresponding to individual units in the transmitted data from back to front according to the third value, wherein a quantity of units corresponding to the first confirmation information is smaller than the third value, and the first confirmation information is located at an initial position of the transmitted data.

Optionally, when a quotient between the quantity of units of the transmitted data and the number of the confirmation information or the number of the granularity is not an integer, the receiving end rounds off the quotient to obtain a fourth value; the receiving end forms the confirmation information sequentially corresponding to individual units in the transmitted data from front to back according to the fourth value, wherein a quantity of units corresponding to the last confirmation information is different from the fourth value, and the last confirmation information is located at an end position of the transmitted data; or, the receiving end forms the confirmation information sequentially corresponding to individual units in the transmitted data from back to front according to the fourth value, wherein a quantity of units corresponding to the first confirmation information is different from the fourth value, and the first confirmation information is located at an initial position of the transmitted data.

Optionally, the implicit rule includes: in the case that the transmitting end transmits the second signaling, if one-time data transmission is in one or multiple mini-slots or slots, the receiving end being instructed to generate the confirmation information according to the granularity.

Optionally, when the granularity is in a non-grouping form, the transmitting end instructs the receiving end, or the transmitting end and the receiving end pre-agree, to form one confirmation information for each granularity, wherein the non-grouping form includes: an OFDM symbol, a CB, a mini-slot, a slot, or a transmission block; and when the granularity is in a grouping form, the transmitting end instructs the receiving end, or the transmitting end and the receiving end pre-agree, to form one confirmation information for each granularity, the transmitting end informs the receiving end of a number of members in the group, or the transmitting end and the receiving end pre-agree on the number of members in the group; if the number of members included in one group is different from the number of members included in other group, the confirmation information of this group is located at an end position or an initial position of the transmitted data, wherein the grouping form includes: an OFDM symbol group, a CBG, a mini-slot group, or a slot group.

Optionally, the implicit rule includes: in the case that the transmitting end transmits the first signaling, if one-time data transmission is in multiple mini-slots or slots, and each mini-slot or slot transmits one Transmission Block TB, or the multiple mini-slots or slots transmit one Transmission Block TB, the receiving end determining a quantity of units corresponding to each confirmation information according to a quantity of units of transmitted data transmitted in the multiple mini-slots or slots and the number of the confirmation information or the number of the granularity, so as to generate the confirmation information, wherein the unit includes at least one of followings: an OFDM symbol, an OFDM symbol group, a CB, a CBG, a mini-slot, a mini-slot group, a slot, a slot group, and a transmission block.

Optionally, if the number of the confirmation information or the number of the granularity is less than a number of the multiple mini-slots or slots, and the number of the confirmation information or the number of the granularity is empty, then the receiving end forms one confirmation information, wherein the one confirmation information corresponds to a sum of Transmission Blocks (TBs) in the multiple mini-slots or slots, or corresponds to one TB transmitted in the multiple mini-slots or slots; if the number of the confirmation information or the number of the granularity is equal to the number of the multiple mini-slots or slots, then each confirmation information corresponds to one mini-slot or slot; and if the number of the confirmation information or the number of the granularity is greater than the number of the multiple mini-slots or slots, then each confirmation information corresponds to one or more continuous units.

Optionally, the implicit rule includes: when the transmitting end transmits the first signaling and the second signaling at the same time, or the first signaling and the second signaling transmitted by the transmitting end are valid at the same time, the transmitting end instructing the receiving end to generate the confirmation information of the quantity required in the first signaling according to the granularity described in the second signaling; or, when the transmitting end transmits the first signaling, and the granularity instructed by the second signaling is pre-agreed, the transmitting end not transmitting the second signaling any longer, and the transmitting end instructing the receiving end to form the confirmation information of the quantity required in the first signaling according to the pre-agreed granularity; or, the transmitting end and the receiving end agreeing that the transmitting end directly or indirectly instructs the receiving end to form the confirmation information according to the transmission block or the code block group in one-time data transmission.

Optionally, the confirmation information includes: confirmation information transmitted through an uplink data channel; or, confirmation information transmitted through an uplink control channel, wherein in the case that only one confirmation information is transmitted in each uplink control channel, a number of the confirmation information or a number of the granularity is the same as a number of the uplink control channel.

Optionally, the one-time data transmission is one-time data transmission scheduled by one downlink control information; or, the one-time data transmission is composed of one or more transmission blocks; or, the one-time data transmission is composed of one or more code block groups and one or more transmission blocks.

Optionally, the signaling includes: a physical layer signaling, wherein the physical layer signaling includes a Downlink Control Information DCI signaling, and the DCI signaling is configured as uplink/downlink data scheduling and transmitting; or, a high layer signaling.

Optionally, the transmitting, by the transmitting end, the signaling includes: when the transmitted downlink control information is to schedule data transmission, transmitting the signaling in the downlink control information, the signaling including at least a first signaling and/or a second signaling.

Optionally, if a high layer signaling is used to transmit the signaling, then the signaling is always valid in a period of validity of the high layer signaling; or, in the period of validity of the high layer signaling, if a physical layer transmits the signaling, then the signaling transmitted by the physical layer is prevailing; or, when the high layer signaling is used to transmit the signaling, a physical layer is allowed to change the signaling into this time of data transmission in a period of validity of the signaling, wherein the signaling includes the first signaling and/or a second signaling.

Optionally, the method further includes: determining, by the transmitting end, a position and a sequence of bits of the confirmation information in an uplink feedback signaling to form a bitmap signaling, and transmitting modulation and coding; or, determining, by the transmitting end, an uplink resource position of bits of each confirmation information, and transmitting modulation and coding independently; or, determining bit groups of the confirmation information and the uplink resource position corresponding to each bit group, and transmitting modulation and coding independently.

Optionally, the signaling is that the transmitting end informs the receiving end of a number of members in the granularity, or the transmitting end and the receiving end pre-agree on the number of members in the granularity, wherein the granularity is in a grouping form, and the grouping form includes at least one of followings: an OFDM symbol group, a CBG, a mini-slot group, and a slot group, and the members include at least one of followings: an OFDM symbol, a CB, a mini-slot, and a slot; and the transmitting end and the receiving end can pre-agree on the granularity or instruct the granularity through the second signaling.

According to an embodiment of the present disclosure, there is also provided a method for processing confirmation information, including: transmitting, by a transmitting end, a signaling to a receiving end; after receiving one-time data transmission, forming confirmation information according to the signaling and transmitting the confirmation information to the receiving end, by the transmitting end, wherein the signaling is configured to instruct the transmitting end to generate confirmation information corresponding to one-time data transmission according to the signaling and in combination with a pre-agreed implicit rule; and the transmitting the signaling and the confirmation information includes: transmitting the signaling through a high layer signaling, and transmitting the confirmation information through downlink control information; or, transmitting the signaling and the confirmation information through one downlink control information at the same time.

According to an embodiment of the present disclosure, there is also provided a method for processing confirmation information, including: receiving, by a receiving end, a signaling; and generating confirmation information corresponding to one-time data transmission according to the signaling and in combination with a pre-agreed implicit rule and transmitting the confirmation information, by the receiving end.

Optionally, the receiving, by the receiving end, the signaling includes: receiving, by the receiving end, a first signaling, wherein the first signaling is configured to instruct a number of the confirmation information or a number of a granularity generated by the receiving end corresponding to one-time data transmission; and/or, receiving, by the receiving end, a second signaling, wherein the second signaling is configured to indicate a granularity used when the receiving end generates the confirmation information corresponding to the one-time data transmission, wherein the granularity includes at least one of followings: an Orthogonal Frequency Division Multiplexing OFDM symbol, an Orthogonal Frequency Division Multiplexing OFDM symbol group, a code block, a code block group, a mini-slot, a mini-slot group, a slot, a slot group, and a transmission block.

Optionally, the implicit rule includes: in the case that the receiving end receives the first signaling, for one-time data transmission in one or more slots, determining a quantity of units corresponding to each confirmation information according to a quantity of units of transmitted data transmitted in one or more slots and the number of the confirmation information or the number of the granularity, so as to form the confirmation information; and forming, by the receiving end, one confirmation information for each granularity, wherein the unit includes at least one of followings: an OFDM symbol, an OFDM symbol group, a CB, a CBG, a mini-slot, a mini-slot group, a slot, a slot group, and a transmission block.

Optionally, when a quotient between the quantity of units of the transmitted data and the number of the confirmation information or the number of the granularity is an integer, the quotient is taken as the quantity of units corresponding to each confirmation information or each granularity; and according to the quantity of units corresponding to each confirmation information or each granularity, the confirmation information is sequentially formed corresponding to each confirmation information or each granularity corresponding to individual units in the transmitted data from front to back or from back to front.

Optionally, when a quotient between the quantity of units of the transmitted data and the number of the confirmation information or the number of the granularity is not an integer, the quotient is rounded up (ceil) to obtain a first value; a quantity of units in the transmitted data corresponding to a part of the confirmation information or a part of the granularity is equal to the first value; the confirmation information or granularity with a smaller quantity of units in the transmitted data is located at an end position or an initial position of all the confirmation information or granularity; the confirmation information is formed sequentially corresponding to individual units in the transmitted data from front to back according to the first value, wherein a quantity of units corresponding to the last confirmation information is smaller than the first value, and the last confirmation information is located at an end position of the transmitted data; or, the receiving end forms the confirmation information sequentially corresponding to individual units in the transmitted data from back to front according to the first value, wherein a quantity of units corresponding to the first confirmation information is smaller than the first value, and the first confirmation information is located at an initial position of the transmitted data.

Optionally, when a quotient between the quantity of units of the transmitted data and the number of the confirmation information or the number of the granularity is not an integer, the quotient is rounded down to obtain a second value; a quantity of units in the transmitted data corresponding to a part of the confirmation information or a part of the granularity is equal to the second value; the confirmation information or granularity with a larger quantity of units in the transmitted data is located at an end position or an initial position of all the confirmation information or granularity; the confirmation information is formed sequentially corresponding to individual units in the transmitted data from front to back according to the second value, wherein a quantity of units corresponding to the last confirmation information is greater than the second value, and the last confirmation information is located at an end position of the transmitted data; or, the receiving end forms the confirmation information sequentially corresponding to individual units in the transmitted data from back to front according to the second value, wherein a quantity of units corresponding to the first confirmation information is greater than the second value, and the first confirmation information is located at an initial position of the transmitted data.

Optionally, when a quotient between the quantity of units of the transmitted data and the number of the confirmation information or the number of the granularity is not an integer, the quotient is rounded down to obtain a third value, and the number of the confirmation information or the number of the granularity is added with 1; the confirmation information is formed sequentially corresponding to individual units in the transmitted data from front to back according to the third value, wherein a quantity of units corresponding to the last confirmation information is smaller than the third value, and the last confirmation information is located at an end position of the transmitted data; or, the receiving end forms the confirmation information sequentially corresponding to individual units in the transmitted data from back to front according to the third value, wherein a quantity of units corresponding to the first confirmation information is smaller than the third value, and the first confirmation information is located at an initial position of the transmitted data.

Optionally, when a quotient between the quantity of units of the transmitted data and the number of the confirmation information or the number of the granularity is not an integer, the quotient is rounded off (round) to obtain a fourth value; the confirmation information is formed sequentially corresponding to individual units in the transmitted data from front to back according to the fourth value, wherein a quantity of units corresponding to the last confirmation information is different from the fourth value, and the last confirmation information is located at an end position of the transmitted data; or, the receiving end forms the confirmation information sequentially corresponding to individual units in the transmitted data from back to front according to the fourth value, wherein a quantity of units corresponding to the first confirmation information is different from the fourth value, and the first confirmation information is located at an initial position of the transmitted data.

Optionally, the implicit rule includes: in the case that the receiving end receives the second signaling, if one-time data transmission is in one mini-slot or slot, generating the confirmation information according to the granularity.

Optionally, when the granularity is in a non-grouping form, one confirmation information is formed for each granularity, wherein the non-grouping form includes: an OFDM symbol, a CB, a mini-slot, a slot, or a transmission block; and when the granularity is in a grouping form, a number of members in the group informed by the transmitting end is received, or the transmitting end and the receiving end pre-agree on the number of members in the group; if the number of members included in one group is different from the number of members included in other groups, the confirmation information of this group is located at an end position or an initial position of the transmitted data, wherein the grouping form includes: an OFDM symbol group, a CBG, a mini-slot group, or a slot group.

Optionally, the implicit rule includes: in the case that the receiving end receives the first signaling, if one-time data transmission is in multiple mini-slots or slots, and each mini-slot or slot transmits one Transmission Block TB, or the multiple mini-slots or slots transmit one TB, a quantity of units corresponding to each confirmation information is determined according to a quantity of units of transmitted data transmitted in the multiple mini-slots or slots and the number of the confirmation information or the number of the granularity, so as to form the confirmation information, wherein the unit includes at least one of followings: an OFDM symbol, an OFDM symbol group, a CB, a CBG, a mini-slot, a mini-slot group, a slot, a slot group, and a transmission block.

Optionally, if the number of the confirmation information or the number of the granularity is less than a number of the multiple mini-slots or slots, and/or the number of the confirmation information or the number of the granularity is empty, then one confirmation information is generated, wherein the one confirmation information corresponds to a sum of Transmission Blocks TBs in the multiple mini-slots or slots, or corresponds to one TB transmitted in the multiple mini-slots or slots; if the number of the confirmation information or the number of the granularity is equal to the number of the multiple mini-slots or slots, then each confirmation information corresponds to one mini-slot or slot; and if the number of the confirmation information or the number of the granularity is greater than the number of the multiple mini-slots or slots, then each confirmation information corresponds to one or more continuous units.

Optionally, the implicit rule includes: when the receiving end receives the first signaling and the second signaling at the same time, or the first signaling and the second signaling received by the receiving end are valid at the same time, generating confirmation information of the quantity required in the first signaling according to the granularity described in the second signaling; or, when the receiving end receives the first signaling, forming, by the receiving end, the confirmation information of the quantity required in the first signaling according to the pre-agreed granularity; or, the transmitting end and the receiving end agreeing that the receiving end forms the confirmation information according to the transmission block or the code block group in one-time data transmission.

Optionally, the confirmation information includes: confirmation information transmitted through an uplink data channel; or, confirmation information transmitted through an uplink control channel, wherein in the case that only one confirmation information is transmitted in each uplink control channel, a number of the confirmation information or a number of a granularity is the same as a number of the uplink control channel.

Optionally, the one-time data transmission is one-time data transmission scheduled by one downlink control information; or, the one-time data transmission is composed of one or more transmission blocks; or, the one-time data transmission is composed of one or more code block groups and one or more transmission blocks.

Optionally, the signaling includes: a physical layer signaling, wherein the physical layer signaling includes a Downlink Control Information DCI signaling, and the DCI signaling is configured as uplink/downlink data scheduling and transmitting; or, a high layer signaling.

Optionally, the receiving, by the receiving end, the signaling includes: when downlink control information received is to schedule data transmission, receiving the signaling in the downlink control information, the signaling including at least a first signaling and/or a second signaling.

Optionally, if the signaling received is transmitted by a high layer signaling, then the signaling is always valid in a period of validity of the high layer signaling; or, in the period of validity of the high layer signaling, if a physical layer is used to transmit the signaling received, then the signaling transmitted by the physical layer is prevailing; or, when the high layer signaling is used to transmit the signaling, the physical layer is allowed to change the signaling into the present time of data transmission in a period of validity of the signaling, wherein the signaling includes the first signaling and/or a second signaling.

Optionally, the method further includes: determining, by the receiving end, a position and a sequence of bits of the confirmation information in an uplink feedback signaling to form a bitmap signaling, and transmitting modulation and coding; or, determining, by the receiving end, an uplink resource position of the bit of each confirmation information, and transmitting modulation and coding independently; or, determining bit groups of the confirmation information and the uplink resource position corresponding to each bit group, and transmitting modulation and coding independently.

Optionally, the method further includes: receiving, by the receiving end, the signaling, the signaling being that the transmitting end informs the receiving end of a number of members in the granularity, or the transmitting end and the receiving end pre-agree on the number of members in the granularity, wherein the granularity is in a grouping form, and the grouping form includes at least one of followings: an OFDM symbol group, a CBG, a mini-slot group, and a slot group, and the members include at least one of the followings: an OFDM symbol, a CB, a mini-slot, and a slot; and the transmitting end and the receiving end can pre-agree on the granularity or instruct the granularity through the second signaling.

Optionally, the method further includes: when the confirmation information is fed back through uplink data, receiving, by the receiving end, the signaling, and also receiving the confirmation information formed by the transmitting end, wherein the receiving the signaling and the confirmation information includes: receiving the signaling through a high layer signaling, and receiving the confirmation information through downlink control information; or, receiving the signaling and the confirmation information through one downlink control information at the same time.

According to another embodiment of the present disclosure, there is also provided an apparatus for processing confirmation information, applied to a transmitting end, including: a first transmitting module configured to transmit a signaling, wherein the signaling is configured to instruct the receiving end to generate confirmation information corresponding to one-time data transmission according to the signaling and in combination with a pre-agreed implicit rule; and a first processing module configured to receive the confirmation information, and parse the confirmation information according to the signaling and in combination with the pre-agreed implicit rule.

Optionally, the first transmitting module includes: a first transmitting unit configured to transmit a first signaling, wherein the first signaling is configured to instruct the receiving end to generate a number of the confirmation information or a number of a granularity corresponding to one-time data transmission of the transmitting end; and/or a second transmitting unit configured to transmit a second signaling, wherein the second signaling is configured to indicate a granularity used by the receiving end for generating the confirmation information corresponding to the one-time data transmission of the transmitting end, wherein the granularity includes at least one of followings: an Orthogonal Frequency Division Multiplexing (OFDM) symbol, an Orthogonal Frequency Division Multiplexing (OFDM) symbol group, a Code Block (CB), a Code Block Group (CBG), a mini-slot, a mini-slot group, a slot, a slot group, and a transmission block.

Optionally, the implicit rule includes: in the case that the transmitting end transmits the first signaling, for one-time data transmission in one or more slots, the receiving end being instructed to determine a quantity of units corresponding to each confirmation information according to a quantity of units of transmitted data transmitted in one or more slots and the number of the confirmation information or the number of the granularity, so as to generate the confirmation information; and instructing, by the transmitting end, the receiving end, or pre-agreeing by the transmitting end and the receiving end, to form one confirmation information for each granularity, wherein the unit includes at least one of followings: an OFDM symbol, an OFDM symbol group, a CB, a CBG, a mini-slot, a mini-slot group, a slot, a slot group, and a transmission block.

Optionally, when a quotient between the quantity of units of the transmitted data and the number of the confirmation information or the number of the granularity is an integer, the receiving end takes the quotient as the quantity of units corresponding to each confirmation information or each granularity; and according to the quantity of units corresponding to each confirmation information or each granularity, the confirmation information is sequentially formed corresponding to each confirmation information or each granularity corresponding to individual units in the transmitted data from front to back or from back to front.

Optionally, when a quotient between the quantity of units of the transmitted data and the number of the confirmation information or the number of the granularity is not an integer, the receiving end rounds up the quotient to obtain a first value; a quantity of units in the transmitted data corresponding to a part of the confirmation information or a part of the granularity is equal to the first value; the confirmation information or granularity with a smaller quantity of units in the transmitted data is located at an end position or an initial position of all the confirmation information or granularity; the receiving end forms the confirmation information sequentially corresponding to individual units in the transmitted data from front to back according to the first value, wherein a quantity of units corresponding to the last confirmation information is smaller than the first value, and the last confirmation information is located at an end position of the transmitted data; or, the receiving end forms the confirmation information sequentially corresponding to individual units in the transmitted data from back to front according to the first value, wherein a quantity of units corresponding to the first confirmation information is smaller than the first value, and the first confirmation information is located at an initial position of the transmitted data.

Optionally, when a quotient between the quantity of units of the transmitted data and the number of the confirmation information or the number of the granularity is not an integer, the receiving end rounds down the quotient to obtain a second value; a quantity of units in the transmitted data corresponding to a part of the confirmation information or a part of the granularity is equal to the second value; the confirmation information or granularity with a larger quantity of units in the transmitted data is located at an end position or an initial position of all the confirmation information or granularity; the receiving end forms the confirmation information sequentially corresponding to individual units in the transmitted data from front to back according to the second value, wherein a quantity of units corresponding to the last confirmation information is greater than the second value, and the last confirmation information is located at an end position of the transmitted data; or, the receiving end forms the confirmation information sequentially corresponding to individual units in the transmitted data from back to front according to the second value, wherein a quantity of units corresponding to the first confirmation information is greater than the second value, and the first confirmation information is located at an initial position of the transmitted data.

Optionally, when a quotient between the quantity of units of the transmitted data and the number of the confirmation information or the number of the granularity is not an integer, the receiving end rounds down the quotient to obtain a third value, and adds 1 to the number of the confirmation information or the number of the granularity; the receiving end forms the confirmation information sequentially corresponding to individual units in the transmitted data from front to back according to the third value, wherein a quantity of units corresponding to the last confirmation information is smaller than the third value, and the last confirmation information is located at an end position of the transmitted data; or, the receiving end forms the confirmation information sequentially corresponding to individual units in the transmitted data from back to front according to the third value, wherein a quantity of units corresponding to the first confirmation information is smaller than the third value, and the first confirmation information is located at an initial position of the transmitted data.

Optionally, when a quotient between the quantity of units of the transmitted data and the number of the confirmation information or the number of the granularity is not an integer, the receiving end rounds off the quotient to obtain a fourth value; the receiving end forms the confirmation information sequentially corresponding to individual units in the transmitted data from front to back according to the fourth value, wherein a quantity of units corresponding to the last confirmation information is different from the fourth value, and the last confirmation information is located at an end position of the transmitted data; or, the receiving end forms the confirmation information sequentially corresponding to individual units in the transmitted data from back to front according to the fourth value, wherein a quantity of units corresponding to the first confirmation information is different from the fourth value, and the first confirmation information is located at an initial position of the transmitted data.

Optionally, the implicit rule includes: in the case that the transmitting end transmits the second signaling, if one-time data transmission is in one or multiple mini-slots or slots, the receiving end being instructed to generate the confirmation information according to the granularity.

Optionally, when the granularity is in a non-grouping form, the transmitting end instructs the receiving end, or the transmitting end and the receiving end pre-agree, to form one confirmation information for each granularity, wherein the non-grouping form includes: an OFDM symbol, a CB, a mini-slot, a slot, or a transmission block; and when the granularity is in a grouping form, the transmitting end instructs the receiving end, or the transmitting end and the receiving end pre-agree, to form one confirmation information for each granularity, the transmitting end informs the receiving end of a number of members in the group, or the transmitting end and the receiving end pre-agree on the number of members in the group; if the number of members included in one group is different from the number of members included in other group, the confirmation information of this group is located at an end position or an initial position of the transmitted data, wherein the grouping form includes: an OFDM symbol group, a CBG, a mini-slot group, or a slot group.

Optionally, the implicit rule includes: in the case that the transmitting end transmits the first signaling, if one-time data transmission is in multiple mini-slots or slots, and each mini-slot or slot transmits one Transmission Block TB, or the multiple mini-slots or slots transmit one Transmission Block TB, the receiving end determining a quantity of units corresponding to each confirmation information according to a quantity of units of transmitted data transmitted in the multiple mini-slots or slots and the number of the confirmation information or the number of the granularity, so as to form the confirmation information, wherein the unit includes at least one of followings: an OFDM symbol, an OFDM symbol group, a CB, a CBG, a mini-slot, a mini-slot group, a slot, a slot group, and a transmission block.

Optionally, if the number of the confirmation information or the number of the granularity is less than a number of the multiple mini-slots or slots, and the number of the confirmation information or the number of the granularity is empty, then the receiving end forms one confirmation information, wherein the one confirmation information corresponds to a sum of Transmission Blocks TBs in the multiple mini-slots or slots, or corresponds to one TB transmitted in the multiple mini-slots or slots; if the number of the confirmation information or the number of the granularity is equal to the number of the multiple mini-slots or slots, then each confirmation information corresponds to one mini-slot or slot; and if the number of the confirmation information or the number of the granularity is greater than the number of the multiple mini-slots or slots, then each confirmation information corresponds to one or more continuous units.

Optionally, the implicit rule includes: when the transmitting end transmits the first signaling and the second signaling at the same time, or the first signaling and the second signaling transmitted by the transmitting end are valid at the same time, the transmitting end instructing the receiving end to generate the confirmation information of the quantity required in the first signaling according to the granularity described in the second signaling; or, when the transmitting end transmits the first signaling, and the granularity instructed by the second signaling is pre-agreed, the transmitting end not transmitting the second signaling any longer, and the transmitting end instructing the receiving end to form the confirmation information of the quantity required in the first signaling according to the pre-agreed granularity; or, the transmitting end and the receiving end agreeing that the transmitting end directly or indirectly instructs the receiving end to form the confirmation information according to the transmission block or the code block group in one-time data transmission.

Optionally, the confirmation information includes: confirmation information transmitted through an uplink data channel; or, confirmation information transmitted through an uplink control channel, wherein in the case that only one confirmation information is transmitted in each uplink control channel, a number of the confirmation information or a number of a granularity is the same as a number of the uplink control channel.

Optionally, the one-time data transmission is one-time data transmission scheduled by one downlink control information; or, the one-time data transmission is composed of one or more transmission blocks; or, the one-time data transmission is composed of one or more code block groups and one or more transmission blocks.

Optionally, the signaling includes: a physical layer signaling, wherein the physical layer signaling includes a Downlink Control Information DCI signaling, and the DCI signaling is configured as uplink/downlink data scheduling and transmitting; or, a high layer signaling.

Optionally, the transmitting, by the transmitting end, the signaling includes: when downlink control information transmitted is to schedule data transmission, transmitting the signaling in the downlink control information, the signaling including at least a first signaling and/or a second signaling.

Optionally, if the signaling received is transmitted by a high layer signaling, then the signaling is always valid in a period of validity of the high layer signaling; or, in the period of validity of the high layer signaling, if a physical layer transmits the signaling, then the signaling transmitted by the physical layer is prevailing; or, when the high layer signaling is used to transmit the signaling, the physical layer is allowed to change the signaling into the present time of data transmission in a period of validity of the signaling, wherein the signaling includes the first signaling and/or the second signaling.

Optionally, the apparatus further includes: a second processing module configured to determine a position and a sequence of bits of the confirmation information in an uplink feedback signaling to form a bitmap signaling, and transmit modulation and coding; or, a third processing module configured to determine an uplink resource position of the bit of each confirmation information, and transmit modulation and coding independently; or, a fourth processing module configured to determine bit groups of the confirmation information and the uplink resource position corresponding to each bit group, and transmit modulation and coding independently.

Optionally, the signaling is that the transmitting end informs the receiving end of a number of members in the granularity, or the transmitting end and the receiving end pre-agree on the number of members in the granularity, wherein the granularity is in a grouping form, and the grouping form includes at least one of the followings: an orthogonal frequency division multiplexing symbol group, a code block group, a mini-slot group, and a slot group, and the members include at least one of the followings: an orthogonal frequency division multiplexing symbol, a code block, a mini-slot; and a slot; and the transmitting end and the receiving end can pre-agree on the granularity or instruct the granularity through the second signaling.

According to another embodiment of the present disclosure, there is also provided an apparatus for processing confirmation information, applied to a transmitting end, including: a second transmitting module configured to transmit a signaling to a receiving end; and a third transmitting module configured to, after receiving one-time data transmission, form confirmation information according to the signaling and transmit the confirmation information to the receiving end, wherein the signaling is configured to instruct the transmitting end to generate confirmation information corresponding to one-time data transmission according to the signaling and in combination with a pre-agreed implicit rule; and the transmitting the signaling and the confirmation information includes: transmitting the signaling through a high layer signaling, and transmitting the confirmation information through downlink control information; or, transmitting the signaling and the confirmation information through one downlink control information at the same time.

According to another embodiment of the present disclosure, there is also provided an apparatus for processing confirmation information, applied to a receiving end, including: a receiving module configured to receive a signaling; and a generating module configured to generate confirmation information corresponding to one-time data transmission according to the signaling and in combination with a pre-agreed implicit rule, and transmit the confirmation information.

Optionally, the receiving module includes: a first receiving unit configured to receive a first signaling, wherein the first signaling is configured to instruct the receiving end to generate a number of the confirmation information or a number of a granularity corresponding to one-time data transmission; and/or, a second receiving unit configured to receive a second signaling, wherein the second signaling is configured to indicate a granularity used by the receiving end for generating the confirmation information corresponding to the one-time data transmission, wherein the granularity includes at least one of followings: an Orthogonal Frequency Division Multiplexing (OFDM) symbol, an Orthogonal Frequency Division Multiplexing (OFDM) symbol group, a code block, a code block group, a mini-slot, a mini-slot group, a slot, a slot group, and a transmission block.

Optionally, the implicit rule includes: in the case that the receiving end receives the first signaling, for one-time data transmission in one or multiple slots, determining a quantity of units corresponding to each confirmation information according to a quantity of units of transmitted data transmitted in one or multiple slots and the number of the confirmation information or the number of the granularity, so as to form the confirmation information; and forming, by the receiving end, one confirmation information for each granularity, wherein the unit includes at least one the followings: an OFDM symbol, an OFDM symbol group, a CB, a CBG, a mini-slot, a mini-slot group, a slot, a slot group, and a transmission block.

Optionally, when a quotient between the quantity of units of the transmitted data and the number of the confirmation information or the number of the granularity is an integer, the quotient is taken as the quantity of units corresponding to each confirmation information or each granularity; and according to the quantity of units corresponding to each confirmation information or each granularity, the confirmation information is sequentially formed corresponding to each confirmation information or each granularity corresponding to individual units in the transmitted data from front to back or from back to front.

Optionally, when a quotient between the quantity of units of the transmitted data and the number of the confirmation information or the number of the granularity is not an integer, the quotient is rounded up to obtain a first value; a quantity of units in the transmitted data corresponding to a part of the confirmation information or a part of the granularity is equal to the first value; the confirmation information or granularity with a smaller quantity of units in the transmitted data is located at an end position or an initial position of all the confirmation information or granularity; the confirmation information is formed sequentially corresponding to individual units in the transmitted data from front to back according to the first value, wherein a quantity of units corresponding to the last confirmation information is smaller than the first value, and the last confirmation information is located at an end position of the transmitted data; or, the receiving end forms the confirmation information sequentially corresponding to individual units in the transmitted data from back to front according to the first value, wherein a quantity of units corresponding to the first confirmation information is smaller than the first value, and the first confirmation information is located at an initial position of the transmitted data.

Optionally, when a quotient between the quantity of units of the transmitted data and the number of the confirmation information or the number of the granularity is not an integer, the quotient is rounded down (floor) to obtain a second value; a quantity of units in the transmitted data corresponding to a part of the confirmation information or a part of the granularity is equal to the second value; the confirmation information or granularity with a larger quantity of units in the transmitted data is located at an end position or an initial position of all the confirmation information or granularity; the confirmation information is formed sequentially corresponding to individual units in the transmitted data from front to back according to the second value, wherein a quantity of units corresponding to the last confirmation information is greater than the second value, and the last confirmation information is located at an end position of the transmitted data; or, the receiving end forms the confirmation information sequentially corresponding to individual units in the transmitted data from back to front according to the second value, wherein a quantity of units corresponding to the first confirmation information is greater than the second value, and the first confirmation information is located at an initial position of the transmitted data.

Optionally, when a quotient between the quantity of units of the transmitted data and the number of the confirmation information or the number of the granularity is not an integer, the quotient is rounded down to obtain a third value, and the number of the confirmation information or the number of the granularity is added with 1; the confirmation information is formed sequentially corresponding to individual units in the transmitted data from front to back according to the third value, wherein a quantity of units corresponding to the last confirmation information is smaller than the third value, and the last confirmation information is located at an end position of the transmitted data; or, the receiving end forms the confirmation information sequentially corresponding to individual units in the transmitted data from back to front according to the third value, wherein a quantity of units corresponding to the first confirmation information is smaller than the third value, and the first confirmation information is located at an initial position of the transmitted data.

Optionally, when a quotient between the quantity of units of the transmitted data and the number of the confirmation information or the number of the granularity is not an integer, the quotient is rounded off to obtain a fourth value; the confirmation information is formed sequentially corresponding to individual units in the transmitted data from front to back according to the fourth value, wherein a quantity of units corresponding to the last confirmation information is different from the fourth value, and the last confirmation information is located at an end position of the transmitted data; or, the receiving end forms the confirmation information sequentially corresponding to individual units in the transmitted data from back to front according to the fourth value, wherein a quantity of units corresponding to the first confirmation information is different from the fourth value, and the first confirmation information is located at an initial position of the transmitted data.

Optionally, the implicit rule includes: in the case that the receiving end receives the second signaling, if one-time data transmission is in one mini-slot or slot, generating the confirmation information according to the granularity.

Optionally, when the granularity is in a non-grouping form, one confirmation information is formed for each granularity, wherein the non-grouping form includes: an OFDM symbol, a CB, a mini-slot, a slot, or a transmission block; and when the granularity is in a grouping form, a number of members in the group informed by the transmitting end is received, or the transmitting end and the receiving end pre-agree on the number of members in the group; if the number of members included in one group is different from the number of members included in other groups, the confirmation information of the group is located at an end position or an initial position of the transmitted data, wherein the grouping form includes: an OFDM symbol group, a CBG, a mini-slot group, or a slot group.

Optionally, the implicit rule includes: in the case that the receiving end receives the first signaling, if one-time data transmission is in multiple mini-slots or slots, and each mini-slot or slot transmits one Transmission Block TB, or the multiple mini-slots or slots transmit one TB, a quantity of units corresponding to each confirmation information is determined according to a quantity of units of transmitted data transmitted in the multiple mini-slots or slots and the number of the confirmation information or the number of the granularity, so as to form the confirmation information, wherein the unit includes at least one of the followings: an OFDM symbol, an OFDM symbol group, a CB, a CBG, a mini-slot, a mini-slot group, a slot, a slot group, and a transmission block.

Optionally, if the number of the confirmation information or the number of the granularity is less than a number of the multiple mini-slots or slots, and the number of the confirmation information or the number of the granularity is empty, then one confirmation information is generated, wherein the one confirmation information corresponds to a sum of Transmission Blocks TBs in the multiple mini-slots or slots, or corresponds to one TB transmitted in the multiple mini-slots or slots; if the number of the confirmation information or the number of the granularity is equal to the number of the multiple mini-slots or slots, then each confirmation information corresponds to one mini-slot or slot; and if the number of the confirmation information or the number of the granularity is greater than the number of the multiple mini-slots or slots, then each confirmation information corresponds to one or more continuous units.

Optionally, the implicit rule includes: when the receiving end receives the first signaling and the second signaling at the same time, or the first signaling and the second signaling received by the receiving end are valid at the same time, generating the required quantity of confirmation information in the first signaling according to the granularity described in the second signaling; or, when the receiving end receives the first signaling, forming, by the receiving end, the required quantity of confirmation information in the first signaling according to the pre-agreed granularity; or, the transmitting end and the receiving end agreeing the receiving end to form the confirmation information according to the transmission block or the code block group in one-time data transmission.

Optionally, the confirmation information includes: confirmation information transmitted through an uplink data channel; or, confirmation information transmitted through an uplink control channel, wherein in the case that only one confirmation information is transmitted in each uplink control channel, a number of the confirmation information or a number of a granularity is the same as a number of the uplink control channel.

Optionally, the one-time data transmission is one-time data transmission scheduled by one downlink control information; or, the one-time data transmission is composed of one or more transmission blocks; or, the one-time data transmission is composed of one or more code block groups and one or more transmission blocks.

Optionally, the signaling includes: a physical layer signaling, wherein the physical layer signaling includes a Downlink Control Information DCI signaling, and the DCI signaling is configured as uplink/downlink data scheduling and transmitting; or, a high layer signaling.

Optionally, the receiving, by the receiving end, the signaling includes: when downlink control information received is to schedule data transmission, receiving the signaling in the downlink control information, the signaling including at least one of a first signaling and a second signaling.

Optionally, if a high layer signaling is used to transmit the signaling received, then the signaling is always valid in a period of validity of the high layer signaling; or, in the period of validity of the high layer signaling, if a physical layer is used to transmit the signaling received, then the signaling transmitted by the physical layer is prevailing; or, when the high layer signaling is used to transmit the signaling, the physical layer allows changing the signaling into the data transmission in a period of validity of the signaling, wherein the signaling includes at least one of the first signaling and a second signaling.

Optionally, the apparatus further includes: a fifth processing module configured to determine a position and a sequence of a bit of the confirmation information in an uplink feedback signaling to form a bitmap signaling, and transmit modulation and coding; or, a sixth processing module configured to determine an uplink resource position of the bit of each confirmation information, and transmit modulation and coding independently; or, a seventh processing module configured to determine bit groups of the confirmation information and the uplink resource position corresponding to each bit group, and transmit modulation and coding independently.

Optionally, the method further includes: receiving, by the receiving end, the signaling, the signaling being that the transmitting end informs the receiving end of a number of members in the granularity, or the transmitting end and the receiving end pre-agree on the number of members in the granularity, wherein the granularity is in a grouping form, and the grouping form includes at least one of the followings: an OFDM symbol group, a CBG, a mini-slot group, and a slot group, and the members include at least one of the followings: an OFDM symbol, a CB, a mini-slot, and a slot; and the transmitting end and the receiving end can pre-agree on the granularity or instruct the granularity through the second signaling.

According to another embodiment of the present disclosure, there is also provided a storage medium. The storage medium is configured to store program codes for executing the following steps:

transmitting, by a transmitting end, a signaling, wherein the signaling is configured to instruct the receiving end to generate confirmation information corresponding to one-time data transmission according to the signaling and in combination with a pre-agreed implicit rule; and receiving, by the transmitting end, the confirmation information, and parsing the confirmation information according to the signaling and in combination with the pre-agreed implicit rule.

Optionally, the storage medium is also configured to store program codes for executing the following steps:

transmitting, by a transmitting end, a signaling to a receiving end; and after receiving one-time data transmission, forming, by the transmitting end, confirmation information according to the signaling and transmitting the confirmation information to the receiving end, wherein the signaling is configured to instruct the transmitting end to generate confirmation information corresponding to one-time data transmission according to the signaling and in combination with a pre-agreed implicit rule; and the transmitting the signaling and the confirmation information includes: transmitting the signaling through a high layer signaling, and transmitting the confirmation information through downlink control information; or, transmitting the signaling and the confirmation information through one downlink control information at the same time.

Optionally, the storage medium is also configured to store program codes for executing the following steps:

receiving, by a receiving end, a signaling; and generating, by the receiving end, confirmation information corresponding to one-time data transmission according to the signaling and in combination with a pre-agreed implicit rule, and transmitting the confirmation information.

Through the present disclosure, the transmitting end transmits the signaling, where the signaling is configured to instruct the receiving end to generate the confirmation information corresponding to one-time data transmission according to the signaling and in combination with the pre-agreed implicit rule; and the transmitting end receives the confirmation information, and parses the confirmation information according to the signaling and in combination with the pre-agreed implicit rule. In other words, the present disclosure generates the corresponding confirmation information by transmitting the signaling to the receiving end and in combination with the pre-negotiated implicit rule, instead of adopting the mechanism of feeding back one confirmation information for one transmission block in the related art, thus solving the problem in the related art that the accuracy of locating the erroneous data caused by a feedback mechanism that one confirmation information is fed back to one transmission block is low, and achieving the technical effect of improving the accuracy of locating the erroneous data.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings illustrated here serve to provide a further understanding of the present disclosure and constitute a part of the application, and the illustrative embodiments of the present disclosure and together with the description thereof serve to explain the present disclosure, and do not constitute inappropriate definition to the present disclosure. In the drawings.

DETAILED DESCRIPTION

The present disclosure will be explained in detail with reference to the accompanying drawings and embodiments hereinafter. It should be noted that, in case of no conflict, the embodiments in the present application and the features in the embodiments may be combined with each other.

It should be noted that the terms "first", "second" and the like in the description and claims of the present disclosure as well as the above drawings are used to distinguish similar objects, and are not necessarily used to describe a specific sequence or a chronological order.

First Embodiment

Figure 1:
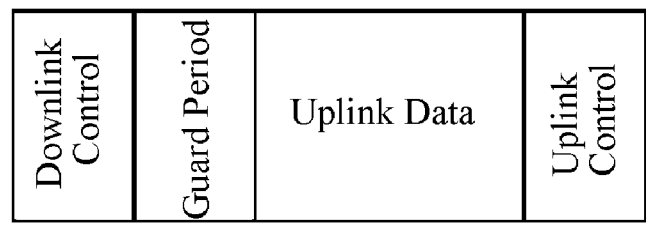
FIG. 1 is a schematic structural diagram of a transmission unit in the early technical discussion of the NR in the related art.
Figure 2:
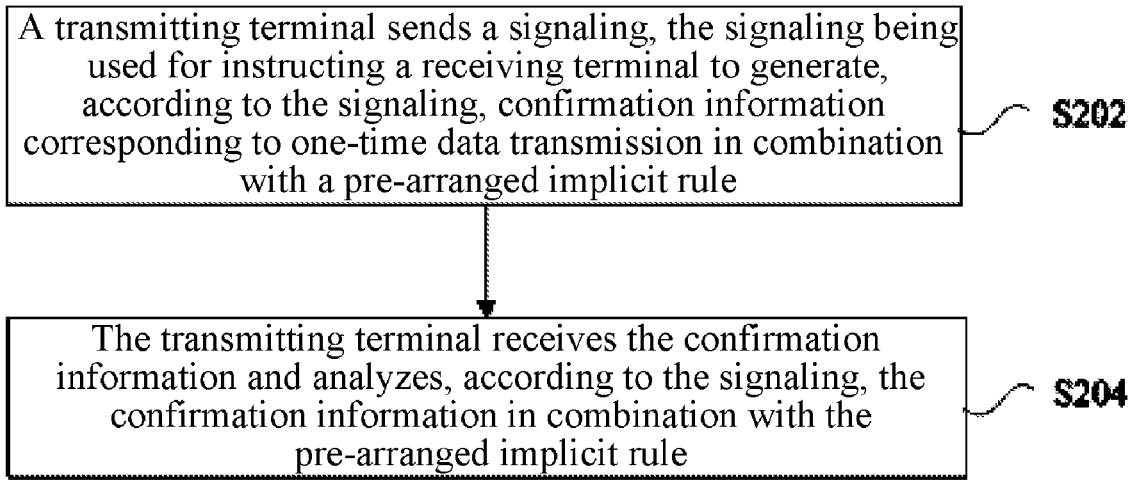
FIG. 2 is a flow chart of a method for processing confirmation information according to an embodiment of the present disclosure.

In this embodiment, a method for processing confirmation information is provided. FIG. 2 is a flow chart of the method for processing confirmation information according to the embodiment of the present disclosure. As shown in FIG. 2, the flow includes the following steps.

In step S202, a transmitting end transmits a signaling, where the signaling is configured to instruct a receiving end to generate confirmation information corresponding to one-time data transmission according to the signaling and in combination with a pre-agreed implicit rule.

Optionally, in the present embodiment, the above-mentioned confirmation information includes, but is not limited to: HARQ ACK, ACK/NACK.

It should be noted that the above confirmation information includes: confirmation information transmitted through an uplink data channel; or, confirmation information transmitted through an uplink control channel, wherein in the case that only one confirmation information is transmitted in each uplink control channel, a number of the confirmation information is the same as a number of the uplink control channel.

The above one-time data transmission is one-time data transmission scheduled by one downlink control information; or, the one-time data transmission is composed of one or more transmission blocks; or, the one-time data transmission is composed of one or more code block groups and one or more transmission blocks.

The above signaling includes: a physical layer signaling, wherein the physical layer signaling includes a Downlink Control Information (DCI) signaling, and the DCI signaling is used for uplink/downlink data scheduling and transmitting; or, a high layer signaling. If the high layer signaling is used to transmit the signaling, then the signaling is always valid in a period of validity of the high layer signaling; or, in the period of validity of the high layer signaling, if the physical layer is used to transmit the signaling, then the signaling transmitted by the physical layer is prevailing.

In step S204, the transmitting end receives the confirmation information, and parses the confirmation information according to the signaling and in combination with the pre-agreed implicit rule.

Optionally, in the present embodiment, an application scenario of the above-mentioned method for processing confirmation information includes, but is not limited to: a new generation system for mobile communication (New Radio, NR for short). In such an application scenario, a transmitting end transmits a signaling, where the signaling is configured to instruct the receiving end to generate confirmation information corresponding to one-time data transmission according to the signaling and in combination with a pre-agreed implicit rule; and the transmitting end receives the confirmation information, and parses the confirmation information according to the signaling and in combination with the pre-agreed implicit rule. In other words, the present embodiment generates the corresponding confirmation information by transmitting the signaling to the receiving end and in combination with the pre-negotiated implicit rule, instead of adopting the mechanism of feeding back one confirmation information for one transmission block in the related art, thus solving the problem of low accuracy of locating the erroneous data caused by a feedback mechanism that one confirmation information is fed back to one transmission block in the related art, and achieving the technical effect of improving the accuracy of locating the erroneous data.

In an optional implementation manner, the transmitting, by the transmitting end, the signaling includes the following steps.

In step S11, the transmitting end transmits a first signaling, where the first signaling is configured to instruct the receiving end to generate a number of the confirmation information or a number of a granularity corresponding to one-time data transmission of the transmitting end;

and/or, in step S12, the transmitting end transmits a second signaling, where the second signaling is configured to indicate a granularity used by the receiving end for generating the confirmation information corresponding to the one-time data transmission of the transmitting end.

The above granularity includes at least one of the followings: an Orthogonal Frequency Division Multiplexing (OFDM) symbol, an Orthogonal Frequency Division Multiplexing (OFDM) symbol group, a Code Block (CB), a Code Block Group (CBG), a mini slot (for example, mini-slot), a mini-slot group, a slot, a slot group, and a transmission block.

By transmitting the first signaling or second signaling mentioned above to the receiving end, the confirmation information with a smaller granularity can be provided, so that the transmitting end can confirm the specific erroneous data.

It should be noted that the second signaling is allowed to be omitted and not transmitted. For example, the granularity may be pre-agreed as one of the granularities, for example, the granularity is agreed as the CBG.

The transmitting end and the receiving end agree to form corresponding confirmation information according to the granularity. For example, the receiving end forms one confirmation information for each granularity, that is, one confirmation information corresponds to one granularity, and one granularity corresponds to one confirmation information (see the examples below for detailed description. The number of the confirmation information and the number of the granularity are the same, and the following description will take the number of the confirmation information and the confirmation information as an example). The first signaling may also be the number of the granularity (if the granularity is pre-agreed, the first signaling may be the number of the granularity agreed).

For example, when the granularity is defaulted or instructed, if the granularity is a code block group, then each code block group forms corresponding confirmation information, and the number of the confirmation information is equal to the number of the code block groups, so the first signaling may also be instructing the number of the code block groups needing to form the confirmation information. The number of code blocks included in each code block group may be informed by signaling or extrapolated according to the transmission block corresponding to the transmitted data. That is, the total number of the code blocks included in the transmission block is known, the number of the code block groups is known, and the number of the code blocks included in each code block group may be calculated, the following embodiments may be referred to for details.

In an optional implementation manner, the above implicit rule includes: in the case that the signaling transmitted by the transmitting end is the first signaling, for one-time data transmission (or one transmission block) in one or more slots (also including mini-slot), the receiving end being instructed to determine a quantity of units corresponding to each confirmation information according to a quantity of units of transmitted data transmitted in one or more slots and the number of the confirmation information or the number of the granularity, so as to form the confirmation information; and instructing, by the transmitting end, the receiving end, or pre-agreeing by the transmitting end and the receiving end, to form one confirmation information for each granularity.

For example, when the unit is the CB and the transmission block in one-time data transmission includes Q1 units (i.e., CB), the first signaling is informed to instruct that the number of the confirmation information is Q2 (when the granularity is determined, the number of the confirmation information instructed by the first signaling is also equal to the instructed number of the granularity needing to feed back the confirmation information, for example, when the granularity is the CBG, it is also equal to the instructed number of the CBG needing to feed back the confirmation information). It is assumed that the granularity feeding back the confirmation information is the CBG, the CB corresponding to each confirmation information (also the CB corresponding to each CBG) may be extrapolated according to Q1 and Q2. Detailed extrapolation is shown in the following examples. For a more specific example, it is assumed that the unit is the CB, and the granularity corresponding to the confirmation information is predetermined as the CBG, then the first signaling describes the number of the confirmation information or describes the number of the CBG needing to feed back the confirmation information (each granularity corresponds to one confirmation information, so the two are the same), a transmission block size of one-time data transmission is known (the transmission block size may be obtained by looking up a table from modulation and coding information and resource allocation information contained in the downlink control information), and the code block included in the transmission block may be fixedly derived according to a protocol. Therefore, when the number of the CBG needing to feed back the confirmation information in one-time transmission is 4, the number of the CB is 10, the first CBG may include the first, second, and third CBs, and the second CBG may include the fourth, fifth, and sixth CBs, the third CBG may include the seventh, eighth, and nine CBs, and the fourth CBG may include the tenth CB.

It should be noted that the unit includes at least one of the followings: an OFDM symbol, an OFDM symbol group, a CB, a CBG, a mini-slot, a mini-slot group, a slot, a slot group, and a transmission block.

Optionally, the determining, by the receiving end, the quantity of units corresponding to each confirmation information according to the quantity of units of the transmitted data transmitted in one or more slots and the number of the confirmation information (or the number of the confirmation information may also be expressed as the number of the granularity, and the number of the confirmation information is used for description in the following) specifically includes two cases, wherein one is when a quotient between the number of units of the transmitted data and the number of the confirmation information is an integer, and the other is when the quotient between the number of units of the transmitted data and the number of the confirmation information is not an integer. The following describes the two cases separately.

When the quotient between the quantity of units of the transmitted data and the number of the confirmation information or the number of the granularity is an integer, the receiving end takes the quotient as the quantity of units corresponding to each confirmation information or each granularity; and according to the quantity of units corresponding to each confirmation information, the confirmation information is sequentially formed corresponding to individual units in the transmitted data from front to back or from back to front.

When the quotient between the quantity of units of the transmitted data and the number of the confirmation information or the number of the granularity is not an integer, the receiving end rounds up the quotient to obtain a first value; and the receiving end forms the confirmation information sequentially corresponding to individual units in the transmitted data from front to back according to the first value, wherein a quantity of units corresponding to the last confirmation information is smaller than the first value, and the last confirmation information is located at an end position of the transmitted data; or, the receiving end forms the confirmation information sequentially corresponding to individual units in the transmitted data from back to front according to the first value, where a quantity of units corresponding to the first confirmation information is smaller than the first value, and the first confirmation information is located at an initial position of the transmitted data.

When the quotient between the quantity of units of the transmitted data and the number of the confirmation information or the number of the granularity is not an integer, the receiving end rounds down the quotient to obtain a second value; and the receiving end forms the confirmation information sequentially corresponding to individual units in the transmitted data from front to back according to the second value, wherein a quantity of units corresponding to the last confirmation information is greater than the second value, and the last confirmation information is located at an end position of the transmitted data; or, the receiving end forms the confirmation information sequentially corresponding to individual units in the transmitted data from back to front according to the second value, wherein a quantity of units corresponding to the first confirmation information is greater than the second value, and the first confirmation information is located at an initial position of the transmitted data.

The present embodiment is further exemplified with reference to the specific example hereinafter.

The transmitting end performs one-time data transmission (for example, transmitting one transmission block) for the receiving end through one slot (or more slots), and the transmitting end transmits scheduling information of the data transmission this time for the receiving end through DCI of a downlink control channel, and meanwhile, the DCI instructs the number q (if the granularity is agreed or the granularity is uniquely fixed, then the number of the confirmation information is the number of the granularity needing to feed back the confirmation information) of the fed back confirmation information corresponding to the data transmission this time to the receiving end. For example, a base station transmits one-time data transmission to a UE this time, and 10 OFDM symbols in one slot (for example, a slot structure includes symbols of two DCIs, 10 symbols of transmitted data, one GAP symbol, and one uplink feedback symbol) are actually used for the transmitted data; meanwhile, the base station requests the UE to feed back five confirmation information, and the granularity is agreed as an OFDM symbol by default. At the moment, the UE forms corresponding confirmation information according to the actual number of symbols and the required number of the confirmation information in the data transmission this time, and according to an agreed rule. According to the agreed rule, the UE divides 10 by 5 and obtains a value 2, i.e., each confirmation information corresponds to two symbols. According to the agreement, every two of the 10 symbols of the transmitted data are sequentially taken from front to back to form corresponding confirmation information, and finally form five confirmation information, that is, the first confirmation information corresponds to the first and second symbols of all the symbols of the transmitted data, the second confirmation information corresponds to the third and fourth symbols of all the symbols of the transmitted data, and so on. For another example, when the base station uses 11 OFDM symbols of one slot for the data transmission this time (for instance, in the previous example, the DCI occupies one symbol, the data transmission has 11 symbols, one GAP symbol, and one uplink feedback symbol); at the moment, according to the agreed rule (rounding down when exact division cannot be implemented), the UE rounds down the value obtained through dividing 11 by 5 to obtain a value 2, that is, the majority of the confirmation information corresponds to 2 symbols (one confirmation information corresponds to more than 2 symbols). In this example, the confirmation information different from other confirmation information (called special confirmation information) corresponds to 3 symbols. It should be noted that the determination of the symbol corresponding to the confirmation information may be implemented by placing the corresponding special confirmation information at the end of all the symbols transmitted; and may also be implemented by placing the corresponding special confirmation information at the origin of all the symbols transmitted. Preferably, the special confirmation information is placed at the origin of all the symbols, such that the special confirmation information is closer to a demodulation reference signal. According to a preferred manner, the first confirmation information corresponds to the first, second and third symbols of all the symbols of the transmitted data, the second confirmation information corresponds to the fourth and fifth symbols of all the symbols of the transmitted data, the third confirmation information corresponds to the sixth and seventh symbols of all the symbols of the transmitted data, the fourth confirmation information corresponds to the eighth and ninth symbols of all the symbols of the transmitted data, and the fifth confirmation information corresponds to the tenth and eleventh symbols of all the symbols of the transmitted data. In this way, after the receiving end transmits the formed confirmation information to the transmitting end, the transmitting end retransmits the symbol with errors.

It should be noted that the foregoing manner of forming the corresponding confirmation information according to the OFDM symbol may be applied to the symbol group in the same manner. In this case, the OFDM symbol is regarded as an OFDM symbol group for processing, but the transmitting end needs to pre-agree on a number of the OFDM symbols included in the symbol group (or the transmitting end informs the receiving end of the number of the OFDM symbols included in the symbol group).

For instance, the transmitting end performs one-time data transmission (for example, transmitting one transmission block) for the receiving end through one slot (or more slots), and the transmitting end transmits scheduling information of the data transmission this time for the receiving end through DCI of a downlink control channel, and meanwhile, the DCI instructs the number q (if the granularity is agreed or the granularity is uniquely fixed, then the number of the confirmation information is the number of the granularity needing to feed back the confirmation information) of the fed back confirmation information corresponding to the data transmission this time to the receiving end. The base station transmits one-time data transmission (for example, one transmission block) to the UE this time, and 10 OFDM symbols in one slot (for example, a slot structure includes two symbols of DCI, 10 symbols of transmitted data, one GAP symbol, and one uplink feedback symbol) are actually used for the transmitted data; meanwhile, the base station requests the UE to feed back five confirmation information, and the granularity is agreed as a symbol group by default. At the moment, the UE forms the corresponding confirmation information according to the actual number of symbols and the required number of the confirmation information (or the number of the granularity needing to feed back the confirmation information, in this example, the number of OFDM symbol group) in the data transmission this time, and according to an agreed rule, wherein the number of symbols included in the symbol group may be agreed or instructed or extrapolated, and is extrapolated in this example. According to the agreed rule, the UE divides the total number of symbols 10 corresponding to the transmission block in the transmission this time by the number of the confirmation information needing to be fed back (or the number of symbol groups needing to feed back the confirmation information) 5 to obtain the value 2, that is, each confirmation information corresponds to two symbols (that is, each symbol group contains two symbols). According to the agreement, every two of the 10 symbols of the transmitted data are sequentially taken from front to back to form corresponding confirmation information (i.e., every two of the 10 symbols of the transmitted data are sequentially taken from front to back to form corresponding symbol groups), and finally form five confirmation information, that is, the first confirmation information corresponds to the first and second symbols of all the symbols of the transmitted data (i.e., the confirmation information of the first symbol group corresponds to the first and second symbols of all the symbols of the transmitted data), and the second confirmation information corresponds to the third and fourth symbols of all the symbols of the transmitted data (i.e., the confirmation information of the second symbol group corresponds to the third and fourth symbols of all the symbols of the transmitted data), and so on. For another example, when the base station uses 11 OFDM symbols of one slot for the data transmission this time (for instance, in the previous example, the DCI occupies one symbol, the data transmission has 11 symbols, one GAP symbol, and one uplink feedback symbol); at the moment, according to the agreed rule (rounding down when exact division cannot be implemented), the UE rounds down the value obtained through dividing 11 by 5 to obtain the value 2. That is, the majority of the confirmation information corresponds to 2 symbols (one confirmation information corresponds to more than 2 symbols). In this example, the confirmation information different from other confirmation information (called special confirmation information, which may be also described as that the confirmation information corresponds to a number of symbols included in the symbol group which is different from that in other symbol groups) corresponds to 3 symbols (i.e., the number of symbols included in one symbol group is different from that in other symbol group). It should be noted that the determination of the symbol corresponding to each confirmation information may by implemented by placing the corresponding special confirmation information at the end of all the symbols transmitted in this time; and may also be implemented by placing the corresponding special confirmation information at the origin of all the symbols transmitted in this time. Preferably, the special confirmation information is placed at the origin of all the symbols, such that the special confirmation information is closer to a demodulation reference signal. According to a preferred manner, the first confirmation information corresponds to the first, second and third symbols of all the symbols of the transmitted data, the second confirmation information corresponds to the fourth and fifth symbols of all the symbols of the transmitted data, the third confirmation information corresponds to the sixth and seventh symbols of all the symbols of the transmitted data, the fourth confirmation information corresponds to the eighth and ninth symbols of all the symbols of the transmitted data, and the fifth confirmation information corresponds to the tenth and eleventh symbols of all the symbols of the transmitted data (or, it may be equivalently described as follows: the symbol group corresponding to the first confirmation information corresponds to the first, second and third symbols of all the symbols of the transmitted data, the symbol group corresponding to the second confirmation information corresponds to the fourth and fifth symbols of all the symbols of the transmitted data, the symbol group corresponding to the third confirmation information corresponds to the sixth and seventh symbols of all the symbols of the transmitted data, the symbol group corresponding to the fourth confirmation information corresponds to the eighth and ninth symbols of all the symbols of the transmitted data, and the symbol group corresponding to the fifth confirmation information corresponds to the tenth and eleventh symbols of all the symbols of the transmitted data). In this way, after the receiving end transmits the formed confirmation information to the transmitting end, the transmitting end retransmits the symbol with error.

Similarly, the above example may also be applied to a code block, a mini-slot, or a slot, in which case the OFDM symbol is regarded as a code block, a mini-slot or a slot.

Similarly, the above example may also be applied to a code block group, a mini-slot group or a slot group. In this case, the OFDM symbol group is regarded as a code block group, a mini slot group or a slot group, and the corresponding OFDM symbol is regarded as a code block, a mini-slot, or a slot. However, the transmitting end needs to pre-agree on the corresponding number of code blocks, the number of mini-slots or the number of slots included in the code block group, the mini-slot group or the slot group (or the transmitting end informs the receiving end of the corresponding number of code blocks, the number of mini-slots or the number of slots included in the code block group, the mini-slot group or the slot group).

Based on the above example, a similar example applied to the code block group is as follows.

It should be noted that the above-described manner of forming the corresponding confirmation information according to the OFDM symbol group may be applied to the code block group in the same manner. However, the transmitting end needs to pre-agree on the number of OFDM symbols included in the code block group (or the transmitting end informs the receiving end of the number of OFDM symbols included in the code block group, or, it may also be extrapolated, and the specific extrapolation may be seen in the descriptions in other examples).

For example, the transmitting end performs one-time data transmission (for example, transmitting one transmission block) for the receiving end through one slot (or more slots), and the transmitting end transmits scheduling information of the data transmission this time for the receiving end through the DCI of the downlink control channel, and meanwhile, the number q of the fed back confirmation information corresponding to the data transmission this time is instructed to the receiving end in the DCI (or, the number of the fed back CBG corresponding to the data transmission this time is instructed to the receiving end in the DCI. And the instruction information may be carried through a RRC message in addition to being carried through the DCI). The base station transmits one-time data transmission (for example, one transmission block) to the UE this time, and the actually transmitted data is divided into 10 code blocks and transmitted in one slot (for example, a slot structure includes 2 symbols of DCI, 10 symbols of transmitted data, one GAP symbol, and one uplink feedback symbol); meanwhile, the base station requests the UE to feed back five confirmation information, and the granularity is a code block group. At the moment, the UE forms the corresponding confirmation information according to the actual number of code blocks and the required number of the confirmation information (or the number of the granularity needing to feed back the confirmation information, i.e., the number of the code block groups in the example) in the data transmission this time, and according to an agreed rule, wherein the number of code blocks included in the code block group may be agreed or instructed or extrapolated, and is extrapolated in this example. According to the agreed rule, the UE divides the total number of code blocks 10 corresponding to the transmission block in the transmission this time by the number of the confirmation information needing to be fed back (or the number of code block groups needing to feed back the confirmation information) 5 to obtain the value 2, that is, each confirmation information corresponds to two code blocks (that is, each code block group contains two code blocks). According to the agreement, every two of the 10 code blocks of the transmitted data are sequentially taken from front to back to form corresponding confirmation information (i.e., every two of the 10 code blocks of the transmitted data are sequentially taken from front to back to form corresponding code block groups), and finally form five confirmation information, that is, the first confirmation information corresponds to the first and second code blocks of all the code blocks of the transmitted data (i.e., the confirmation information of the first code block group corresponds to the first and second code blocks of all the code blocks of the transmitted data), the second confirmation information corresponds to the third and fourth code blocks of all the code blocks of the transmitted data (i.e., the confirmation information of the second code block corresponds to the third and fourth code blocks of all the code blocks of the transmitted data), and so on. For another example, when the base station uses 11 code blocks to perform the data transmission this time, at the moment, according to the agreed rule (rounding down or up when exact division cannot be implemented, wherein rounding down is used in this example), the UE rounds down the value obtained through dividing 11 by 5 to obtain the value 2, that is, the majority of the confirmation information corresponds to 2 code blocks (one confirmation information corresponds to more than 2 code blocks). In this example, the confirmation information different from other confirmation information (called special confirmation information, which may be also described as that the confirmation information corresponds to a number of code blocks included in the code block group which is different from that in other code block groups) corresponds to 3 code blocks (i.e., the number of code blocks included in one code block group is different from that in other code block group). It should be noted that the determination of the code block corresponding to each confirmation information may be implemented by placing the corresponding special confirmation information at the end of all the code blocks transmitted in this time; and may also be implemented by placing the corresponding special confirmation information at the origin of all the code blocks transmitted in this time. Preferably, the special confirmation information is placed at the origin of all the code blocks, such that the special confirmation information is closer to a demodulation reference signal. According to a preferred manner, the first confirmation information corresponds to the first, second and third code blocks of all the code blocks of the transmitted data, the second confirmation information corresponds to the fourth and fifth code blocks of all the code blocks of the transmitted data, the third confirmation information corresponds to the sixth and seventh code blocks of all the code blocks of the transmitted data, the fourth confirmation information corresponds to the eighth and ninth code blocks of all the code blocks of the transmitted data, and the fifth confirmation information corresponds to the tenth and eleventh code blocks of all the code blocks of the transmitted data (or, it may be equivalently described as follows: the code block group corresponding to the first confirmation information corresponds to the first, second and third code blocks of all the code blocks of the transmitted data, the code block group corresponding to the second confirmation information corresponds to the fourth and fifth code blocks of all the code blocks of the transmitted data, the code block group corresponding to the third confirmation information corresponds to the sixth and seventh code blocks of all the code blocks of the transmitted data, the code block group corresponding to the fourth confirmation information corresponds to the eighth and ninth code blocks of all the code blocks of the transmitted data, and the code block group corresponding to the fifth confirmation information corresponds to the tenth and eleventh code blocks of all the code blocks of the transmitted data). In this way, after the receiving end transmits the formed confirmation information to the transmitting end, the transmitting end retransmits the symbol with errors.

In the present embodiment, it is also supported that, when the granularity is in a grouping form, for example, the granularity is a symbol group, a code block group, a mini-slot group, or a slot group, the transmitting end further configures a quantity of units included in the grouping granularity. For example, when the agreed granularity is a code block group, the transmitting end configures a number of code blocks included in the code block group for the UE. This configuration may be specifically as follows: the base station and the UE may pre-agree that the fed back granularity is a code block group, and then the base station configures the number of code blocks included in the code block group, so that the UE knows the number of code blocks included in each code block group, and then the UE may also the number of code blocks included in the transmission block in one-time transmission. In this way, the UE corresponds the transmitted code blocks to each code block group according to the number of code blocks included in the code block group, thereby obtaining the number of the code block groups, i.e., obtaining the number of the granularity needing to feed back.

The determination of the number of information may also be extrapolated in the following two ways.

When a quotient between the quantity of units of the transmitted data and the number of the confirmation information or the number of the granularity is not an integer, the receiving end rounds down the quotient to obtain a third value, and the number of the confirmation information or the number of the granularity is added with 1; and the receiving end forms the confirmation information sequentially corresponding to individual units in the transmitted data from front to back according to the third value, wherein a quantity of units corresponding to the last confirmation information is smaller than the third value, and the last confirmation information is located at an end position of the transmitted data; or, the receiving end forms the confirmation information sequentially corresponding to individual units in the transmitted data from back to front according to the third value, wherein a quantity of units corresponding to the first confirmation information is smaller than the third value, and the first confirmation information is located at an initial position of the transmitted data.

When the quotient between the quantity of units of the transmitted data and the number of the confirmation information or the number of the granularity is not an integer, the receiving end rounds off the quotient to obtain a fourth value; and the receiving end forms the confirmation information sequentially corresponding to individual units in the transmitted data from front to back according to the fourth value, wherein a quantity of units corresponding to the last confirmation information is different from the fourth value, and the last confirmation information is located at an end position of the transmitted data; or, the receiving end forms the confirmation information sequentially corresponding to individual units in the transmitted data from back to front according to the fourth value, wherein a quantity of units corresponding to the first confirmation information is different from the fourth value, and the first confirmation information is located at an initial position of the transmitted data.

The present embodiment is further exemplified with reference to the specific example hereinafter.

The transmitting end performs one-time data transmission for the receiving end through one slot (or more slots), and the transmitting end transmits scheduling information of the data transmission this time for the receiving end through DCI of a downlink control channel, and meanwhile, instructs the receiving end of the number of the fed back confirmation information corresponding to the data transmission this time in the DCI. For example, the base station transmits one-time data transmission to the UE this time, and 10 OFDM symbols in one slot (for example, a slot structure includes 2 symbols of DCI, 10 symbols of transmitted data, one GAP symbol, and one uplink feedback symbol) are actually used for the transmitted data; meanwhile, the base station requests the UE to feed back five confirmation information. At the moment, the UE forms corresponding confirmation information according to the actual number of symbols and the required number of the confirmation information in the data transmission this time, and according to an agreed rule. According to the agreed rule, the UE divides 10 by 5 and obtains a value 2, i.e., each confirmation information corresponds to two symbols. According to the agreement, every two of the 10 symbols of the transmitted data are sequentially taken from front to back to form corresponding confirmation information, and finally form five confirmation information, that is, the first confirmation information corresponds to the first and second symbols of all the symbols of the transmitted data, the second confirmation information corresponds to the third and fourth symbols of all the symbols of the transmitted data, and so on. For another example, when the base station uses 11 OFDM symbols of one slot for the data transmission this time (for instance, in the previous example, the DCI occupies one symbol, the data transmission has 11 symbols, one GAP symbol, and one uplink feedback symbol); at the moment, according to the agreed rule (rounding off when exact division cannot be implemented), the UE rounds off the value obtained through dividing 11 by five to obtain the value 2, that is, the majority of the confirmation information corresponds to 2 symbols (one confirmation information corresponds to more than 2 symbols). In this example, the confirmation information different from other confirmation information (called special confirmation information) corresponds to 3 symbols. It should be noted that the determination of the symbol corresponding to the confirmation information may be implemented by placing the corresponding special confirmation information at the end of all the symbols transmitted; and may also be implemented by placing the corresponding special confirmation information at the origin of all the symbols transmitted. Preferably, the special confirmation information is placed at the origin of all the symbols, such that the special confirmation information is closer to a demodulation reference signal. According to a preferred manner, the first confirmation information corresponds to the first, second and third symbols of all the symbols of the transmitted data, the second confirmation information corresponds to the fourth and fifth symbols of all the symbols of the transmitted data, the third confirmation information corresponds to the sixth and seventh symbols of all the symbols of the transmitted data, the fourth confirmation information corresponds to the eighth and ninth symbols of all the symbols of the transmitted data, and the fifth confirmation information corresponds to the tenth and eleventh symbols of all the symbols of the transmitted data.

It should be noted that the foregoing manner of forming the corresponding confirmation information according to the OFDM symbol may be applied to the symbol group in the same manner. In this case, the OFDM symbol is regarded as an OFDM symbol group for processing, but the transmitting end needs to pre-agree on a number of the symbols included in the symbol group (or the transmitting end informs the receiving end of the number of the symbols included in the symbol group).

Similarly, the above example may also be applied to a code block, a mini-slot, or a slot, in which case the OFDM symbol is regarded as a code block, a mini-slot or a slot.

Similarly, the above example may also be applied to a code block group, a mini-slot group or a slot group. In this case, the OFDM symbol group is regarded as a code block group, a mini slot group or a slot group, and the corresponding OFDM symbol is regarded as a code block, a mini-slot, or a slot. However, the transmitting end needs to pre-agree on the corresponding number of code blocks, the number of mini-slots or the number of slots included in the code block group, the mini-slot group or the slot group (or the transmitting end informs the receiving end of the corresponding number of code blocks, the number of mini-slots or the number of slots included in the code block group, the mini-slot group or the slot group).

Alternatively, the number of the confirmation information may also be instructed by a high layer, and dynamically adjusted by a physical layer, which specifically includes the following content, where the number of the confirmation information is represented by a q value:

the transmitting end configures the q value through the high layer signaling, and the high layer signaling is transmitted to the receiving end. In the period of validity of the high layer signaling, the receiving end always forms corresponding confirmation information for the received data according to the q value of the high layer signaling.

When the transmitting end needs to temporarily adjust the forming of the confirmation information of the receiving end, the transmitting end may transmit a temporary q value according to the manner in the above example. When the receiving end receives a q value different from that configured by the high layer signaling from the DCI, the receiving end forms confirmation information for the data transmission this time according to the q value informed by the DCI.

When the transmitting end does not need to adjust the forming of the confirmation information of the receiving end, the transmitting end may not instruct a new q value in the DCI, or not transmit a bit of the q value in the DCI.

In an optional implementation manner, the above implicit rule further includes:

in the case that the signaling transmitted by the transmitting end is the second signaling, if one-time data transmission is in one or multiple mini-slots or slots, the receiving end being instructed to generate the confirmation information according to the granularity. When the granularity is in a non-grouping form, the transmitting end instructs the receiving end, or the transmitting end and the receiving end pre-agree, to form one confirmation information for each granularity, wherein the non-grouping form includes: an OFDM symbol, or a CB, or a mini-slot, or a slot, or a transmission block; and when the granularity is in a grouping form, the transmitting end instructs the receiving end, or the transmitting end and the receiving end pre-agree, to form one confirmation information for each granularity, the transmitting end informs the receiving end of a number of members in the group, or the transmitting end and the receiving end pre-agree on the number of members in the group; if the number of members included in one granularity group is different from the number of members included in other group, the confirmation information of the granularity group is located at an end position or an initial position of the transmitted data, wherein the grouping form includes: an OFDM symbol group, or a CBG, or a mini-slot group, or a slot group.

The embodiment is further exemplified with reference to the following optional examples hereinafter.

First Optional Example

The transmitting end performs one-time data transmission for the receiving end through one slot (or more slots), and the transmitting end transmits scheduling information of the data transmission this time for the receiving end through DCI of a downlink control channel, and meanwhile, instructs the receiving end of the granularity formed by the fed back confirmation information corresponding to the data transmission this time in the DCI, or the granularity is pre-agreed. The granularity includes: an OFDM symbol, an OFDM symbol group, a code block, a code block group, a mini-slot, a mini-slot group, a slot, a slot group, and a transmission block.

For example, the base station transmits one-time data transmission to the UE this time, and 10 OFDM symbols in one slot (for example, a slot structure includes 2 symbols of DCI, 10 symbols of transmitted data, one GAP symbol, and one uplink feedback symbol; here, it can also be described in that the transmission block of the actually transmitted data includes 10 code blocks in total, and the code blocks are obtained according to a coding principal, and belong to known information) are actually used for the transmitted data; meanwhile, the base station informs that the granularity of the confirmation information this time is an OFDM symbol group (here, it is assumed that the number of symbols included in the OFDM symbol group is pre-agreed by the transmitting end and the receiving end, and may also be informed in the DCI or extrapolated at the same time, and it is assumed here that the symbol group includes 2 symbols; if the granularity is a CBG, the corresponding here is that the CBG includes 2 CBs). At the moment, the UE forms the confirmation information according to the actual number of symbols and the given granularity in the data transmission this time, and according to an agreed rule. For example, for the symbols of the transmission blocks of all the transmitted data this time, every two of the 10 symbols, from front to back or from back to front, form one confirmation information corresponding to one symbol group (if the granularity is a CBG, for example, for the CB of the transmission block of all the transmitted data this time, every two CBs, from front to back or from back to front, form one confirmation information corresponding to one CBG). It should be noted that for the symbol group (or CBG) corresponding to the last or first confirmation information (called special confirmation information), the number of symbols (or CBs) allowed to be included is different from that included in other.

For another example, when the base station uses 11 OFDM symbols of one slot to perform the data transmission this time (for instance, in the previous example, the DCI occupies one symbol, and the data transmission has 11 symbols, one GAP symbol, and one uplink feedback symbol); at the moment, processing is performed according to last example and according to the agreed rule. It should be noted that the determination of the symbol group corresponding to the confirmation information may be implemented by placing the corresponding special confirmation information at the end of all the symbols transmitted; and may also be implemented by placing the corresponding special confirmation information at the origin of all the symbols transmitted. Preferably, the special confirmation information is placed at the origin of all the symbols, such that the special confirmation information is closer to a demodulation reference signal. According to a preferred manner, all the symbol groups of the transmitted data corresponding to the first confirmation information (which happens to be the special confirmation information) include the first symbol, all the symbol groups of the transmitted data corresponding to the second confirmation information include the second and third symbols, all the symbol groups of the transmitted data corresponding to the third confirmation information include the fourth and fifth symbols, all the symbol groups of the transmitted data corresponding to the fourth confirmation information include the sixth and seventh symbols, all the symbol groups of the transmitted data corresponding to the fifth confirmation information include the eighth and ninth symbols, and all the symbol groups of the transmitted data corresponding to the sixth confirmation information include the tenth and eleventh symbols.

A similar manner may be used for the case where the granularity is other unit, and reference may be made to this embodiment.

It is noted that the transmitting end can inform the receiving end at the same time of the number of the confirmation information and the granularity corresponding to the data transmission this time. In this way, the receiving end forms the corresponding confirmation information according to the combination of the two.

Second Optional Example

The transmitting end and the receiving end agree that the transmitting end may directly or indirectly instruct the receiving end to form the confirmation information according to the Transmission Block (TB), CB or CBG in one-time data transmission. That is to say, when the granularity refers to multiple types, the transmitting end needs to further instruct or imply the specific type of the granularity used this time. For example, when the above granularity is TB and CBG, the transmitting end needs to instruct or imply the receiving end to form the confirmation information according to the TB or CBG. It is noted that if the confirmation information is formed in the case that the granularity is a CBG group, and the number of the confirmation information is required to be one, then the CBG group includes all the CBs of the TB, and in fact, it is indirectly implied that the confirmation information is formed according to the TB.

For example, when the transmitting end needs the receiving end to form the corresponding confirmation information according to the TB for one-time data transmission, the transmitting end instructs the receiving end through the DCI in the downlink control that the corresponding confirmation information needs to be formed according to the TB. When the transmitting end needs the receiving end to form the corresponding confirmation information according to the CB for one-time data transmission, the transmitting end sends DCI instruction to the receiving end through the downlink control to indicate that the corresponding confirmation information needs to be formed according to the CB. For instance, when the transmitting end needs the receiving end to form the corresponding confirmation information according to the CBG for one-time data transmission, the transmitting end sends the DCI to the receiving end through the downlink control to indicate that the corresponding confirmation information needs to be formed according to the CBG. At this time, the transmitting end and the receiving end need to agree on the number of CBs included in the CBG, or the transmitting end informs the receiving end through a signaling, or the transmitting end implicitly informs through the number of the confirmation information (or the number of the granularity, in the example, the granularity is a CBG). For example, the receiving end uses the CBG as the granularity, and is instructed to form q confirmation information (i.e., q confirmation information is formed according to the granularity, and each granularity corresponds to one confirmation information, and the details are as below). At the moment, the receiving end and the transmitting end extrapolate the number of CBs included in the CBG corresponding to each confirmation information in the manner described in the first, second and third embodiments. For example, the transmission block of the data transmission this time has 11 CBs, and the number of the confirmation information required to be formed is 3, then the number of CBs included in each CB group is:

rounding down the value obtained through dividing 11 by 3; then, the CBs included in the CB group corresponding to the confirmation information is determined from back to front, the CB group corresponding to the first confirmation information (special confirmation information) includes the first five CBs, the CB group corresponding to the second confirmation information includes the subsequent three CBs, and the CB group corresponding to the third confirmation information includes the last three CBs; or, the CBG corresponding to the first confirmation information includes the first three CBs, the CBG corresponding to the second confirmation information includes the subsequent three CBs, and the CBG corresponding to the third confirmation information (special confirmation information) includes the last five CBs;

or, rounding up the value obtained through dividing 11 by 3; then, the CBs included in the CB group corresponding to the confirmation information is determined from back to front, the CB group corresponding to the first confirmation information (special confirmation information) includes the first three CBs, the CBG corresponding to the second confirmation information includes the subsequent four CBs, and the CB group corresponding to the third confirmation information includes the last four CBs; or, the CBG corresponding to the first confirmation information includes the first four CBs, the CB group corresponding to the second confirmation information includes the subsequent four CBs, and the CB group corresponding to the third confirmation information (special confirmation information) includes the last three CBs.

In an optional implementation manner, the above implicit rule further includes:

in the case that the signaling transmitted by the transmitting end is the first signaling, if one-time data transmission is in multiple mini-slots or slots, and each mini-slot or slot transmits one Transmission Block (TB), or the multiple mini-slots or slots transmit one TB, then the receiving end determines a quantity of units corresponding to each confirmation information according to a quantity of units of transmitted data transmitted in the multiple mini-slots or slots and the number of the confirmation information or the number of the granularity, so as to form the confirmation information.

It should be noted that the above unit includes at least one of the followings: an OFDM symbol, an OFDM symbol group, a CB, a CBG, a mini-slot, a mini-slot group, a slot, a slot group, and a transmission block.

Optionally, if the number of the confirmation information or the number of the granularity is less than a number of the multiple mini-slots or slots, or the number of the confirmation information or the number of the granularity is empty, then the receiving end forms one confirmation information, wherein the one confirmation information corresponds to a sum of Transmission Blocks (TBs) in the multiple mini-slots or slots, or corresponds to one TB transmitted in the multiple mini-slots or slots; if the number of the confirmation information or the number of the granularity is equal to the number of the multiple mini-slots or slots, then each confirmation information corresponds to one mini-slot or slot; and if the number of the confirmation information or the number of the granularity is greater than the number of the multiple mini-slots or slots, then each confirmation information corresponds to one or more continuous units.

In an optional implementation manner, the above implicit rule further includes:

when the transmitting end transmits the first signaling and the second signaling at the same time, or the first signaling and the second signaling transmitted by the transmitting end are valid at the same time, the transmitting end instructing the receiving end to generate the required quantity of confirmation information in the first signaling according to the granularity described in the second signaling; or, when the transmitting end transmits the first signaling, and the granularity instructed by the second signaling is pre-agreed, the transmitting end not transmitting the second signaling any longer, and the transmitting end instructing the receiving end to form the required quantity of confirmation information in the first signaling according to the pre-agreed granularity; or, the transmitting end and the receiving end agreeing that the transmitting end directly or indirectly instructs the receiving end to form the confirmation information according to the Transmission Block (TB) or the CBG in one-time data transmission.

Optionally, the transmitting, by the transmitting end, the signaling includes the following step.

In step S21, when downlink control information transmitted is to schedule data transmission, the signaling is transmitted in the downlink control information, the signaling including a first signaling and/or a second signaling.

Optionally, the above-mentioned method for processing confirmation information further includes the following steps.

In step S31, the transmitting end determines a position and a sequence of bits of the confirmation information in an uplink feedback signaling to form a bitmap signaling, and performing modulation, coding and transmission; or, in step S32, the transmitting end determines an uplink resource position of the bit of each confirmation information, and transmitting by modulation and coding independently; or, in step S33, the transmitting end determines bit groups of the confirmation information and the uplink resource position corresponding to each bit group, and transmitting by modulation and coding independently.

Optionally, in the present implementation, the above signaling is that the transmitting end informs the receiving end of a number of members in the granularity, or the transmitting end and the receiving end pre-agree on the number of members in the granularity, wherein the granularity is in a grouping form, and the grouping form includes at least one of the followings: an orthogonal frequency division multiplexing symbol group, a code block group, a mini-slot group, and a slot group, and the members include at least one of the followings: an orthogonal frequency division multiplexing symbol, a code block, a mini-slot; and a slot; and the transmitting end and the receiving end may pre-agree on the granularity or instruct the granularity through the second signaling.

Through the method for processing confirmation information provided by the present embodiment, the transmitting end and the receiving end form the confirmation information corresponding to one-time data transmission by agreeing, which can reduce the overhead of implementing the confirmation information with flexible quantity, thereby enabling the transmitting end to request the receiving end to feed back corresponding confirmation information according to the resources of the uplink control channel and the importance of the transmitted data, and especially when the uplink control channel resources are not short, or when the transmitted data is important, enabling the transmitting end to promptly instruct the receiving end to form dense confirmation information, so that the transmitting end can only retransmit the erroneous part in case of erroneous transmission, thereby reducing the volume of the data retransmitted. When the uplink control resources are short, while the uplink transmission resources are not short, the transmitting end may instruct the receiving end to form confirmation information with low overhead.

Through the description of the above embodiments, those skilled in the art can clearly understand that the method according to the above embodiments can be implemented by means of software plus a necessary general hardware platform, and the method can be implemented by means of hardware, but in many cases, the former is a better implementation manner. Based on such understanding, the essence of the technical solutions of the embodiments of the present disclosure, or the part contributing to the prior art, may be embodied in the form of a software product which is stored in a storage medium (such as a ROM/RAM, a magnetic disk, an optical disk) including a number of instructions such that a terminal device (which may be a handset, a computer, a server, or a network device, etc.) performs all or part of the method described in each of the embodiments of the present disclosure.

Second Embodiment

There is also provided an apparatus for processing confirmation information in the present embodiment. The apparatus is adapted to implement the foregoing embodiments and preferred implementation manners, but those which have been described will not be described repeatedly. As used below, the term "module" can implement a combination of software and/or hardware with a predetermined function. Although the apparatus described in the following embodiment is preferably implemented by means of software, the implementation of hardware or a combination of software and hardware is also possible and conceived.

Figure 3:
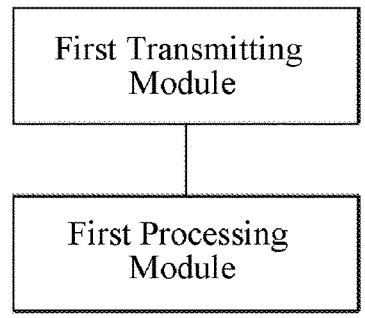
FIG. 3 is a structural block diagram of an apparatus for processing confirmation information according to an embodiment of the present disclosure.

FIG. 3 is a structural block diagram of the apparatus for processing confirmation information according to the embodiment of the present disclosure. As shown in FIG. 3, the apparatus includes: a first transmitting module 32 and a first processing module 34.

1) The first transmitting module 32 is configured to transmit a signaling, wherein the signaling is configured to instruct the receiving end to generate confirmation information corresponding to one-time data transmission according to the signaling and in combination with a pre-agreed implicit rule.

Optionally, in the present embodiment, the above-mentioned confirmation information may include, but is not limited to: HARQ ACK, and ACK/NACK.

It should be noted that the above confirmation information includes: confirmation information transmitted through an uplink data channel; or, confirmation information transmitted through an uplink control channel, wherein in the case that only one confirmation information is transmitted in each uplink control channel, a number of the confirmation information or a number of a granularity is the same as a number of the uplink control channel.

The above data transmission is one-time data transmission scheduled by one downlink control information.

The above signaling includes a physical layer signaling or a high layer signaling, wherein the physical layer signaling includes Downlink Control Information (DCI) signaling, and the DCI signaling is used for uplink/downlink data scheduling and transmitting.

2) The first processing module 34 is configured to receive the confirmation information, and parse the confirmation information according to the signaling and in combination with the pre-agreed implicit rule.

Optionally, in the present embodiment, an application scenario of the above-mentioned apparatus for processing confirmation information includes, but is not limited to: a new generation system for mobile communication (New Radio, NR for short). In such an application scenario, a transmitting end transmits a signaling, wherein the signaling is configured to instruct the receiving end to generate confirmation information corresponding to one-time data transmission according to the signaling and in combination with a pre-agreed implicit rule; and receives the confirmation information, and parses the confirmation information according to the signaling and in combination with the pre-agreed implicit rule. In other words, the present embodiment generates the corresponding confirmation information by transmitting the signaling to the receiving end and in combination with the pre-negotiated implicit rule, instead of adopting the mechanism of feeding back one confirmation information for one transmission block in the related art, thus solving the problem of low accuracy of locating the erroneous data caused by a feedback mechanism that one confirmation information is fed back to one transmission block in the related art, and achieving the technical effect of improving the accuracy of locating the erroneous data.

Figure 4:
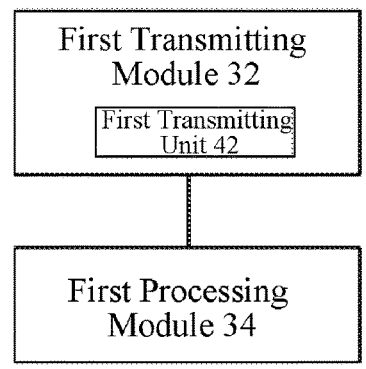
FIG. 4 is a first structural block diagram of an apparatus for processing confirmation information according to an embodiment of the present disclosure.

FIG. 4 is a first structural block diagram of an apparatus for processing confirmation information according to an embodiment of the present disclosure. As shown in FIG. 4, the first transmitting module 32 includes:

1) a first transmitting unit 42 configured to transmit a first signaling, wherein the first signaling is configured to instruct the receiving end to generate a number of the confirmation information or a number of a granularity corresponding to one-time data transmission;

and/or a second transmitting unit used to equivalently replace the first transmitting unit 42, wherein the second transmitting unit is configured to transmit a second signaling, wherein the second signaling is configured to indicate a granularity used by the receiving end for generating the confirmation information corresponding to the one-time data transmission of the transmitting end, the granularity including at least one of the followings: an Orthogonal Frequency Division Multiplexing (OFDM) symbol, an Orthogonal Frequency Division Multiplexing (OFDM) symbol group, a Code Block (CB), a Code Block Group (CBG), a mini-slot, a mini-slot group, a slot, a slot group, and a transmission block.

Through the apparatus shown in FIG. 4, the confirmation information with a smaller granularity can be provided, so that the transmitting end can confirm the specific erroneous data.

Figure 5:
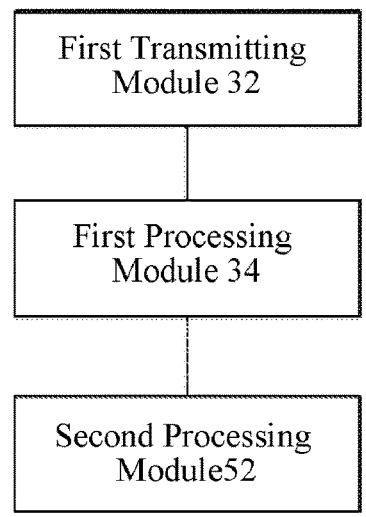
FIG. 5 is a second structural block diagram of an apparatus for processing confirmation information according to an embodiment of the present disclosure.

FIG. 5 is a second structural block diagram of an apparatus for processing confirmation information according to an embodiment of the present disclosure. As shown in FIG. 5, excluding the modules shown in FIG. 3, the apparatus further includes:

1) a second processing module 52 configured to determine a position and a sequence of bits of the confirmation information in an uplink feedback signaling to form a bitmap signaling, and transmit after modulation and coding; or, a third processing module or a fourth processing module used to equivalently replace the second processing module 52, wherein the third processing module is configured to determine an uplink resource position of the bit of each confirmation information, and transmit after modulation and coding independently; and the fourth processing module is configured to determine bit groups of the confirmation information and the uplink resource position corresponding to each bit group, and transmit after modulation and coding independently.

It should be noted that the above modules may be implemented by software or hardware. For the latter, it may be implemented by the following manners, but is not limited to this: the above modules are all disposed in the same processor; or, the above modules are respectively located in different processors in any combination form.

Third Embodiment

Figure 6:
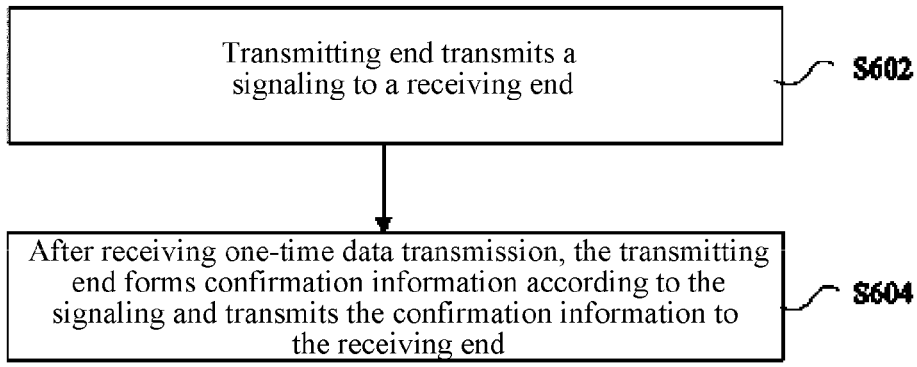
FIG. 6 is a flow chart of another method for processing confirmation information according to an embodiment of the present disclosure.

In the present embodiment, there is also provided another method for processing confirmation information. FIG. 6 is a flow chart of another method for processing confirmation information according to the embodiment of the present disclosure. As shown in FIG. 6, the flow includes the following steps.

In step S602, a transmitting end transmits a signaling to a receiving end.

In step S604, after receiving one-time data transmission, the transmitting end forms confirmation information according to the signaling and transmitting the confirmation information to the receiving end.

It should be noted that the above signaling is configured to instruct the transmitting end to generate confirmation information corresponding to one-time data transmission according to the signaling and in combination with a pre-agreed implicit rule, wherein the transmitting the signaling and the confirmation information includes: transmitting the signaling through a high layer signaling, and transmitting the confirmation information through downlink control information; or, transmitting the signaling and the confirmation information through one downlink control information at the same time.

The embodiment is further exemplified with reference to the specific example hereinafter.

In the example, the confirmation information may be formed by a base station.

It is assumed that when uplink data of the receiving end (for example, UE) is transmitted, there are also multiple transmission modes in the foregoing embodiments (all the data transmitting in the foregoing embodiments is downlink data transmitting actually), which is equivalent to that the uplink data transmitting also has the same mode as that of the downlink data transmitting. At this moment, since the uplink data transmitting is scheduled by the base station, the transmitting is performed by the UE; while the downlink data transmitting is scheduled by the base station, and the transmitting is also performed by the base station. A similar processing method also exists for the confirmation information corresponding to the uplink data.

If the transmitting end (for example, a base station) needs to transmit the confirmation information corresponding to one-time uplink data receiving to the UE, the transmitting end firstly informs or pre-agrees the number of the confirmation information and/or granularity information to the receiving end, and then the transmitting end forms corresponding confirmation information according to the number and/or the granularity and in combination with the pre-agreed rule, and then transmits the confirmation information to the receiving end. The receiving end receives the number of the confirmation information and/or granularity information transmitted by the transmitting end, and then receives the confirmation information, and parses the confirmation information according to the number and/or granularity and in combination with the pre-agreed rule. Alternatively, the transmitting end may transmit the number of the confirmation information and/or granularity information corresponding to one-time uplink data receiving together with the confirmation information to the receiving end.

Optionally, when the granularity is in a non-grouping form, the transmitting end instructs the receiving end, or the transmitting end and the receiving end pre-agree, to form one confirmation information for each granularity, wherein the non-grouping form includes: an orthogonal frequency division multiplexing symbol, or a code block, or a mini-slot, or a slot, or a transmission block.

For example, a detailed example is that the base station receives the uplink data transmitted by the UE, and forms one confirmation information for each granularity according to the configured or agreed granularity. For example 1, the base station and the UE agree on that the granularity is a code block group. After receiving one-time uplink data (for example, one transmission block) of the UE, the base station performs decoding, and then forms confirmation information according to the CBG. For the number of the confirmation information formed, i.e., the number of the granularity, the base station may preconfigure or pre-agree with the UE, for example, preconfigure the number of the granularity by a high layer signaling. Here, it is assumed that the number of the granularity of the confirmation information formed or the number of the confirmation information is pre-configured by the high layer signaling. Then, the base station may extrapolate code blocks included in each granularity according to the number of code blocks in the uplink data transmitted this time and the number of the granularity for forming the confirmation information, wherein an estimation rule may refer to other examples mentioned above. The base station forms one confirmation information for each granularity, composes a bitmap signaling, and transmits the signaling to the UE in the downlink control information DCI. The UE confirms which code block group is erroneous according to the confirmation information, and then retransmits the error code block group. For example 2, based on the example 1, it is assumed here that the number of the confirmation information is dynamically configured by the base station. For example, the base station configures the number of the confirmation information of the current travel or the number of the granularity for the uplink data received this time. At the moment, the base station needs to transmit the confirmation information formed as well as the number of the granularity of the confirmation information.

In the present embodiment, the transmission manners of the number of the confirmation information and/or the transmission mode of the granularity information may be as follows:

the transmitting end may increase the number of the confirmation information and/or granularity information corresponding to the data transmission scheduled this time in uplink authorization information or downlink authorization information, so that the receiving end may know the number of the confirmation information to be formed and/or granularity information in this data transmission after receiving the uplink/downlink authorization information, and then form the corresponding confirmation information in combination with the agreed rule.

For a more detailed processing method, the processing method in each of the above embodiments may be used (wherein, the transmitting end and the receiving end need to be interchanged), and the principles of the methods are the same.

Fourth Embodiment

There is also provided an apparatus for processing confirmation information in the present embodiment. The apparatus is adapted to implement the foregoing embodiments and preferred implementation manners, but those which have been described will not be described repeatedly. As used below, the term "module" may implement a combination of software and/or hardware with a predetermined function. Although the apparatus described in the following embodiment is preferably implemented by means of software, the implementation of hardware or a combination of software and hardware is also possible and conceived.

Figure 7:
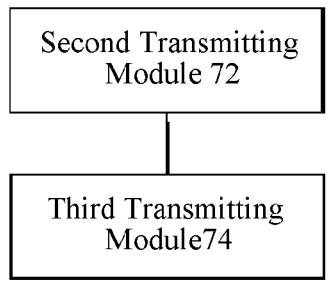
FIG. 7 is a structural block diagram of another apparatus for processing confirmation information according to an embodiment of the present disclosure.

FIG. 7 is a structural block diagram of another apparatus for processing confirmation information according to an embodiment of the present disclosure. As shown in FIG. 7, the apparatus includes:

1) a second transmitting module 72 configured to transmit a signaling to a receiving end; and 2) a third transmitting module 74 configured to, after receiving one-time data transmission, form confirmation information according to the signaling and transmit the confirmation information to the receiving end;

wherein, the signaling is configured to instruct the transmitting end to generate confirmation information corresponding to one-time data transmission according to the signaling and in combination with a pre-agreed implicit rule; and the transmitting the signaling and the confirmation information includes: transmitting the signaling through a high layer signaling, and transmitting the confirmation information through downlink control information.

Fifth Embodiment

Figure 8:
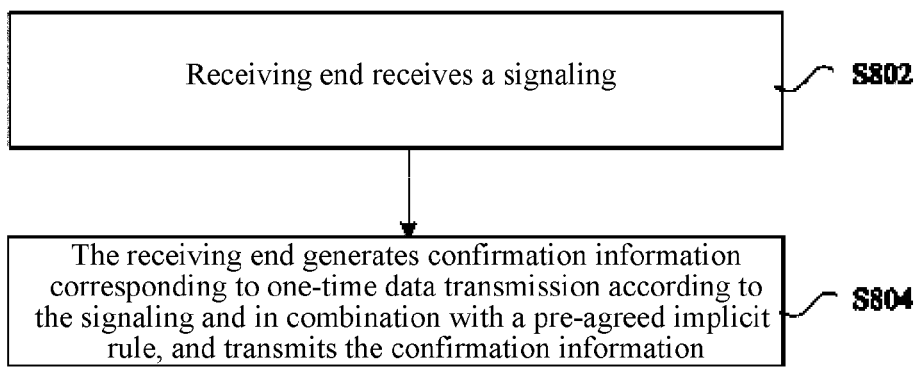
FIG. 8 is a flow chart of still another method for processing confirmation information according to an embodiment of the present disclosure.

In the present embodiment, there is provided a method for processing confirmation information. FIG. 8 is a flow chart of another method for processing confirmation information according to the embodiment of the present disclosure. As shown in FIG. 8, the flow includes the following steps.

In step S802, a receiving end receives a signaling.

In step S804, the receiving end generates confirmation information corresponding to one-time data transmission according to the signaling and in combination with a pre-agreed implicit rule, and transmitting the confirmation information.

Optionally, in the present embodiment, the above-mentioned confirmation information includes, but is not limited to: HARQ ACK, and ACK/NACK.

It should be noted that the above confirmation information includes: confirmation information transmitted through an uplink data channel; or, confirmation information transmitted through an uplink control channel, wherein in the case that only one confirmation information is transmitted in each uplink control channel, a number of the confirmation information or a number of a granularity is the same as a number of the uplink control channel.

The above data transmission is one-time data transmission scheduled by one downlink control information; or, the one-time data transmission is composed of one or more transmission blocks; or, the one-time data transmission is composed of one or more code block groups and one or more transmission blocks.

The above signaling includes a physical layer signaling or a high layer signaling, wherein the physical layer signaling includes Downlink Control Information (DCI) signaling, and the DCI signaling is used for uplink/downlink data scheduling and transmitting; and if a high layer signaling is used to transmit the signaling received, then the signaling is always valid in a period of validity of the high layer signaling; or, in the period of validity of the high layer signaling, if a physical layer is used to transmit the signaling received, then the signaling transmitted by the physical layer is prevailing; or, when the high layer signaling is used to transmit the signaling, the physical layer allows changing the signaling into the data transmission in a period of validity of the signaling, wherein the signaling includes a first signaling and/or a second signaling.

Optionally, in the present embodiment, an application scenario of the above-mentioned method for processing confirmation information includes, but is not limited to: a new generation system for mobile communication (New Radio, NR for short). In such an application scenario, the receiving end receives the signaling, and the receiving end generates confirmation information corresponding to one-time data transmission according to the signaling and in combination with a pre-agreed implicit rule, and transmits the confirmation information. In other words, the present embodiment generates the corresponding confirmation information by receiving the signaling transmitted by the transmitting end and in combination with the pre-negotiated implicit rule, instead of adopting the mechanism of feeding back one confirmation information for one transmission block in the related art, thus solving the problem of low accuracy of locating the erroneous data caused by a feedback mechanism that one confirmation information is fed back to one transmission block in the related art, and achieving the technical effect of improving the accuracy of locating the erroneous data.

In an optional implementation manner, the receiving, by the receiving end, the signaling includes the following steps:

step S41, the receiving end receives a first signaling, wherein the first signaling is configured to instruct a number of the confirmation information or a number of a granularity generated by the receiving end corresponding to one-time data transmission;

and/or, step S42, the receiving end receives a second signaling, wherein the second signaling is configured to indicate a granularity used when the receiving end generates the confirmation information corresponding to the one-time data transmission, the granularity including at least one of the followings: an Orthogonal Frequency Division Multiplexing (OFDM) symbol, an Orthogonal Frequency Division Multiplexing (OFDM) symbol group, a Code Block (CB), a Code Block Group (CBG), a mini-slot, a mini-slot group, a slot, a slot group, and a transmission block.

By receiving the first signaling and/or second signaling mentioned above, the confirmation information with a smaller granularity can be provided, so that the transmitting end can confirm the specific erroneous data. The receiving end and the transmitting end can agree on a granularity in the second signaling, and the second signaling can be no longer transmitted after the granularity is agreed on.

In an optional implementation manner, the above implicit rule includes: in the case that the signaling received by the receiving end is the first signaling, for one-time data transmission in one or more slots, determining a quantity of units corresponding to each confirmation information according to a quantity of units of transmitted data transmitted in one or more slots and the number of the confirmation information or the number of the granularity, so as to form the confirmation information; and forming, by the receiving end, one confirmation information for each granularity.

It should be noted that the above unit includes at least one of the followings: an OFDM symbol, an OFDM symbol group, a CB, a CBG, a mini-slot, a mini-slot group, a slot, a slot group, and a transmission block.

The determining, by the receiving end, the quantity of units corresponding to each confirmation information quantity of units corresponding to each confirmation information according to the quantity of units of the transmitted data transmitted in one or more slots and the number of the confirmation information or the number of the granularity includes two cases, wherein one case is that a quotient between the quantity of units of the transmitted data and the number of the confirmation information is an integer, and the other case is that the quotient between the quantity of units of the transmitted data and the number of the confirmation information is not an integer. The following describes the two cases separately.

When a quotient between the quantity of units of the transmitted data and the number of the confirmation information or the number of the granularity is an integer, the quotient is taken as the quantity of units corresponding to each confirmation information or each granularity; and according to the quantity of units corresponding to each confirmation information, the confirmation information is sequentially formed corresponding to individual units in the transmitted data from front to back or from back to front.

When a quotient between the quantity of units of the transmitted data and the number of the confirmation information or the number of the granularity is not an integer, the quotient is rounded up to obtain a first value; and the confirmation information is formed sequentially corresponding to individual units in the transmitted data from front to back according to the first value, wherein a quantity of units corresponding to the last confirmation information is smaller than the first value, and the last confirmation information is located at an end position of the transmitted data; or, the confirmation information is formed sequentially corresponding to individual units in the transmitted data from back to front according to the first value, wherein a quantity of units corresponding to the first confirmation information is smaller than the first value, and the first confirmation information is located at an initial position of the transmitted data.

When a quotient between the quantity of units of the transmitted data and the number of the confirmation information or the number of the granularity is not an integer, the quotient is rounded down to obtain a second value; and the confirmation information is formed sequentially corresponding to individual units in the transmitted data from front to back according to the second value, wherein a quantity of units corresponding to the last confirmation information is greater than the second value, and the last confirmation information is located at an end position of the transmitted data; or, the confirmation information is formed sequentially corresponding to individual units in the transmitted data from back to front according to the second value, wherein a quantity of units corresponding to the first confirmation information is greater than the second value, and the first confirmation information is located at an initial position of the transmitted data.

When a quotient between the quantity of units of the transmitted data and the number of the confirmation information or the number of the granularity is not an integer, the quotient is rounded down to obtain a third value, and the number of the confirmation information or the number of the granularity is added with 1; and the confirmation information is formed sequentially corresponding to individual units in the transmitted data from front to back according to the third value, wherein a quantity of units corresponding to the last confirmation information is smaller than the third value, and the last confirmation information is located at an end position of the transmitted data; or, the confirmation information is formed sequentially corresponding to individual units in the transmitted data from back to front according to the third value, wherein a quantity of units corresponding to the first confirmation information is smaller than the third value, and the first confirmation information is located at an initial position of the transmitted data.

When a quotient between the quantity of units of the transmitted data and the number of the confirmation information or the number of the granularity is not an integer, the quotient is rounded off to obtain a fourth value; and the confirmation information is formed sequentially corresponding to individual units in the transmitted data from front to back according to the fourth value, wherein a quantity of units corresponding to the last confirmation information is different from the fourth value, and the last confirmation information is located at an end position of the transmitted data; or, the confirmation information is formed sequentially corresponding to individual units in the transmitted data from back to front according to the fourth value, wherein a quantity of units corresponding to the first confirmation information is different from the fourth value, and the first confirmation information is located at an initial position of the transmitted data.

In an optional implementation manner, the above implicit rule includes: in the case that the signaling received by the receiving end is the second signaling, if one-time data transmission is in one mini-slot or slot, generating the confirmation information according to the granularity.

When the granularity is in a non-grouping form, one confirmation information is formed for each granularity, wherein the non-grouping form includes: an OFDM symbol, or a CB, or a mini-slot, or a slot, or a transmission block; and when the granularity is in a grouping form, a number of members in the group informed by the transmitting end is received, or the transmitting end and the receiving end pre-agree on the number of members in the group; if the number of members included in one group is different from the number of members included in other group, the confirmation information of the group is located at an end position or an initial position of the transmitted data, wherein the grouping form includes: an OFDM symbol group, or a CBG, or a mini-slot group, or a slot group.

In an optional implementation manner, the above implicit rule includes:

in the case that the signaling received by the receiving end is the first signaling, if one-time data transmission is in multiple mini-slots or slots, and each mini-slot or slot transmits one Transmission Block (TB), or the multiple mini-slots or slots transmit one TB, a quantity of units corresponding to each confirmation information is determined according to a quantity of units of transmitted data transmitted in the multiple mini-slots or slots and the number of the confirmation information or the number of the granularity, so as to form the confirmation information.

It should be noted that the above unit includes at least one of the followings: an OFDM symbol, an OFDM symbol group, a CB, a CBG, a mini-slot, a mini-slot group, a slot, a slot group, and a transmission block.

If the number of the confirmation information or the number of the granularity is less than a number of the multiple mini-slots or slots, or the number of the confirmation information or the number of the granularity is empty, then one confirmation information is generated, wherein the one confirmation information corresponds to a sum of Transmission Blocks (TBs) in the multiple mini-slots or slots, or corresponds to one TB transmitted in the multiple mini-slots or slots; if the number of the confirmation information or the number of the granularity is equal to the number of the multiple mini-slots or slots, then each confirmation information corresponds to one mini-slot or slot; and if the number of the confirmation information or the number of the granularity is greater than the number of the multiple mini-slots or slots, then each confirmation information corresponds to one or more continuous units.

In an optional implementation manner, the above implicit rule further includes: when the receiving end receives the first signaling and the second signaling at the same time, or the first signaling and the second signaling received by the receiving end are valid at the same time, generating the required quantity of confirmation information in the first signaling according to the granularity described in the second signaling; or, when the receiving end receives the first signaling, forming, by the receiving end, the required quantity of confirmation information in the first signaling according to the pre-agreed granularity; or, the transmitting end and the receiving end agreeing the receiving end to form the confirmation information according to the transmission block or the code block group in one-time data transmission.

Optionally, the receiving, by the receiving end, the signaling includes the following step.

In step S51, when downlink control information received is to schedule data transmission, the signaling is received in the downlink control information, the signaling including a first signaling and/or a second signaling.

Optionally, in the present embodiment, an application scenario of the above-mentioned method for processing confirmation information further includes the following steps:

step S61, the receiving end determines a position and a sequence of a bit of the confirmation information in an uplink feedback signaling to form a bitmap signaling, and performing modulation, coding and transmission; or, step S62, the receiving end determines an uplink resource position of the bit of each confirmation information, and modulating and coding independently and then transmitting; or, step S62, the receiving end determines bit groups of the confirmation information and the uplink resource position corresponding to each bit group, and modulating and coding independently and then transmitting.

In an optional implementation manner, the method further includes: receiving, by the receiving end, the signaling, the signaling being that the transmitting end informs the receiving end of a number of members in the granularity, or the transmitting end and the receiving end pre-agree on the number of members in the granularity, wherein the granularity is in a grouping form, and the grouping form includes at least one of the followings: an OFDM symbol group, a CBG, a mini-slot group, and a slot group, and the members include at least one of the followings: an OFDM symbol, a CB, a mini-slot, and a slot; and the transmitting end and the receiving end may pre-agree on the granularity or instruct the granularity through the second signaling.

Through the method for processing confirmation information provided by the present embodiment, the transmitting end and the receiving end form the confirmation information corresponding to one-time data transmission by agreeing, which can reduce the overhead of implementing the confirmation information with flexible quantity, thereby enabling the transmitting end to request the receiving end to feed back corresponding confirmation information according to the resources of the uplink control channel and the importance of the transmitted data, and especially when the uplink control channel resources are not short, or when the transmitted data is important, enabling the transmitting end to promptly instruct the receiving end to form dense confirmation information, so that the transmitting end can only retransmit the erroneous part in case of erroneous transmission, thereby reducing the volume of the data retransmitted. When the uplink control resources are short, while the uplink transmission resources are not short, the transmitting end can instruct the receiving end to form confirmation information with low overhead.

Through the description of the above embodiments, those skilled in the art can clearly understand that the method according to the above embodiments can be implemented by means of software plus a necessary general hardware platform, and the method can be implemented by means of hardware, but in many cases, the former is a better implementation manner. Based on such understanding, the essence of the technical solutions of the embodiments of the present disclosure, or the part contributing to the prior art, may be embodied in the form of a software product which is stored in a storage medium (such as a ROM/RAM, a magnetic disk, an optical disk) including a number of instructions such that a terminal device (which may be a handset, a computer, a server, or a network device, etc.) performs all or part of the method described in each of the embodiments of the present disclosure.

Sixth Embodiment

There is also provided an apparatus for processing confirmation information in the present embodiment. The apparatus is adapted to implement the foregoing embodiments and preferred implementation manners, but those which have been described will not be described repeatedly. As used below, the term "module" can implement a combination of software and/or hardware with a predetermined function. Although the apparatus described in the following embodiment is preferably implemented by means of software, the implementation of hardware or a combination of software and hardware is also possible and conceived.

Figure 9:
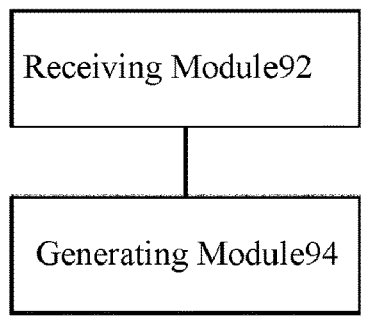
FIG. 9 is a structural block diagram of still another apparatus for processing confirmation information according to an embodiment of the present disclosure.

FIG. 9 is a structural block diagram of still another apparatus for processing confirmation information according to an embodiment of the present disclosure. As shown in FIG. 9, the apparatus includes:

1) a receiving module 92 configured to receive a signaling; and 2) a generating module 94 configured to generate confirmation information corresponding to one-time data transmission according to the signaling and in combination with a pre-agreed implicit rule, and transmit the confirmation information.

Optionally, in the present embodiment, the above-mentioned confirmation information includes, but is not limited to: HARQ ACK, and ACK/NACK.

Optionally, in the present embodiment, an application scenario of the above-mentioned apparatus for processing confirmation information includes, but is not limited to: a new generation system for mobile communication (New Radio, NR for short). In such an application scenario, the receiving end receives the signaling, and the receiving end generates confirmation information corresponding to one-time data transmission according to the signaling and in combination with a pre-agreed implicit rule, and transmits the confirmation information. In other words, the present embodiment generates the corresponding confirmation information by receiving the signaling transmitted by the transmitting end and in combination with the pre-negotiated implicit rule, instead of adopting the mechanism of feeding back one confirmation information for one transmission block in the related art, thus solving the problem of low accuracy of locating the erroneous data caused by a feedback mechanism that one confirmation information is fed back to one transmission block in the related art, and achieving the technical effect of improving the accuracy of locating the erroneous data.

Figure 10:
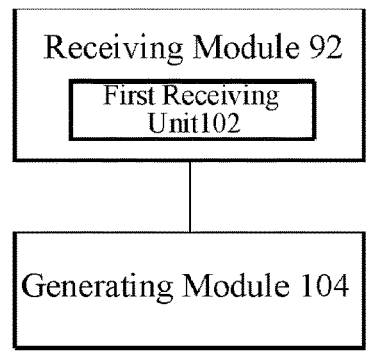
FIG. 10 is a first structural block diagram of still another apparatus for processing confirmation information according to an embodiment of the present disclosure.

FIG. 10 is a first structural block diagram of still another apparatus for processing confirmation information according to an embodiment of the present disclosure. As shown in FIG. 10, the receiving module 92 includes:

1) a first receiving unit 102 configured to receive a first signaling, wherein the first signaling is configured to instruct the receiving end to generate a number of the confirmation information or a number of a granularity corresponding to one-time data transmission;

and/or a second receiving unit used to equivalently replace the first receiving unit 102 mentioned above, wherein the second receiving unit is configured to receive a second signaling, wherein the second signaling is configured to indicate a granularity used by the receiving end for generating the confirmation information corresponding to the one-time data transmission, the granularity including at least one of the followings: an Orthogonal Frequency Division Multiplexing (OFDM) symbol, an Orthogonal Frequency Division Multiplexing (OFDM) symbol group, a Code Block (CB), a Code Block Group (CBG), a mini-slot, a mini-slot group, a slot, a slot group, and a transmission block.

Through the apparatus shown in FIG. 10, the confirmation information with a smaller granularity can be provided, so that the transmitting end can confirm the specific erroneous data.

Figure 11:
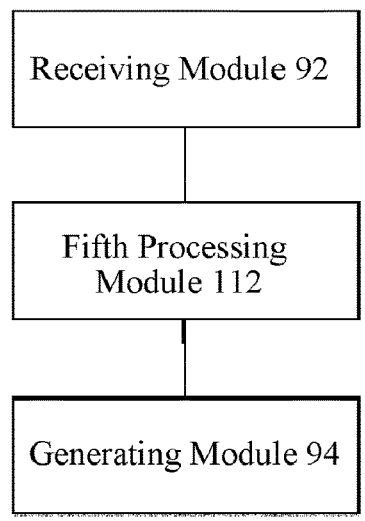
FIG. 11 is a second structural block diagram of still another apparatus for processing confirmation information according to an embodiment of the present disclosure.

FIG. 11 is a second structural block diagram of still another apparatus for processing confirmation information according to an embodiment of the present disclosure. As shown in FIG. 11, excluding the modules shown in FIG. 9, the apparatus further includes:

1) a fifth processing module 112 configured to determine a position and a sequence of a bit of the confirmation information in an uplink feedback signaling to form a bitmap signaling, and transmit modulation and coding; or, a sixth processing module or a seventh processing module used to equivalently replace the fifth processing module 112, wherein the six processing module is configured to determine an uplink resource position of the bit of each confirmation information, and transmit modulation and coding independently; and the seventh processing module is configured to determine bit groups of the confirmation information and the uplink resource position corresponding to each bit group, and transmit modulation and coding independently.

Seventh Embodiment

There is also provided a storage medium in the present embodiment of the present disclosure. Optionally, the above storage medium in the embodiment may be configured to store program codes for executing the following steps.

In S1, a transmitting end transmits a signaling, wherein the signaling is configured to instruct a receiving end to generate confirmation information corresponding to one-time data transmission according to the signaling and in combination with a pre-agreed implicit rule.

In S2, the transmitting end receives the confirmation information, and parsing the confirmation information according to the signaling and in combination with the pre-agreed implicit rule.

Optionally, the above storage medium in the embodiment may be configured to store program codes for executing the following steps.

In S3, the transmitting transmits the signaling to the receiving end.

In S4, after receiving one-time data transmission, the transmitting end forms the confirmation information according to the signaling and transmitting the confirmation information to the receiving end, wherein the signaling is configured to instruct the transmitting end to generate confirmation information corresponding to one-time data transmission according to the signaling and in combination with a pre-agreed implicit rule; and the transmitting the signaling and the confirmation information includes: transmitting the signaling through a high layer signaling, and transmitting the confirmation information through downlink control information; or, transmitting the signaling and the confirmation information through one downlink control information at the same time.

Optionally, the above storage medium is further configured to store program codes for executing the following steps.

In S4, the receiving end receives the signaling.

In S5, the receiving end generates the confirmation information corresponding to one-time data transmission according to the signaling and in combination with the pre-agreed implicit rule, and transmitting the confirmation information.

Optionally, in the embodiment, the above-mentioned storage medium may include, but is not limited to: any medium that is capable of storing program codes such as a USB disk, a Read-Only Memory (ROM), a Random Access Memory (RAM), a mobile hard disk, a magnetic disk or an optical disk, and the like.

Optionally, in the embodiment, the processor executes the above-mentioned steps S1 and S2 according to the program codes stored in the storage medium.

Optionally, in the embodiment, the processor executes the above-mentioned steps S3 and S4 according to the program codes stored in the storage medium.

Optionally, in the embodiment, the processor executes the above-mentioned steps S5 and S6 according to the program codes stored in the storage medium.

Optionally, for a specific example in this embodiment, reference may be made to the examples described in the foregoing embodiments and optional embodiments, which will not be elaborated in this embodiment.

It will be apparent to those skilled in the art that the above-described modules or steps of the invention may be implemented by a general purpose computing device which may be focused on a single computing device or distributed over a plurality of computing devices, which may optionally be implemented by a program code executable by the computing device, so that they may be stored in a storage device by the computing device and, in some cases, the steps shown or described may be performed in sequence different from here; or they are separately made into a single integrated circuit module, or multiple modules or steps in them are made into a single integrated circuit module. In this way, the invention is not limited to any particular combination of hardware and software.

Those described above are merely optional embodiment of the invention, but are not intended to limit the invention. The invention may have various modification and changes to those skilled in the art. Any modifications, equivalent substitutions and improvements made without departing from the spirit and principle of the invention shall all fall within the scope of protection of the invention. The technical features contained in the above embodiments can be combined in one embodiment or used in combination in case of no conflict.

What is claimed is:

1. A method for processing confirmation information, comprising:
    transmitting, by a transmitting end, a signaling, wherein the signaling is configured to instruct a receiving end to generate confirmation information corresponding to one-time data transmission through one transmission block according to the signaling and in combination with a pre-agreed implicit rule; and
    receiving, by the transmitting end, the confirmation information, and parsing the confirmation information according to the signaling and in combination with the pre-agreed implicit rule,
    wherein the transmitting, by the transmitting end, the signaling comprises:
    transmitting, by the transmitting end, a first signaling, wherein the first signaling is configured to instruct the receiving end to generate a number of granularities corresponding to one-time data transmission of the transmitting end; and/or
    transmitting, by the transmitting end, a second signaling, wherein the second signaling is configured to indicate a type of a granularity used by the receiving end for generating the confirmation information corresponding to the one-time data transmission of the transmitting end,
    wherein, the type of the granularity comprises at least one of followings: a code block, a code block group, and a transmission block, wherein units in the one transmission block is divided according to the indicated type of the granularity to obtain the indicated number of granularities, and one confirmation information is separately formed for each of the obtained granularities, wherein the signaling is transmitted by a high layer signaling or a physical layer; and the confirmation information comprises HARQ ACK, ACK/NACK.

2. The method according to claim 1, wherein the implicit rule comprises:

if the transmitting end transmits the first signaling, for one-time data transmission, the receiving end being instructed to determine a quantity of units corresponding to each granularity according to a quantity of the units in the one transmission block and the number of the confirmation information or the number of the granularities, so as to form the confirmation information or the granularities; and instructing, by the transmitting end, the receiving end, or pre-agreeing by the transmitting end and the receiving end, to separately form one confirmation information for each granularity;

wherein a unit comprises at least one of followings: a code block, a code block group, and a transmission block.

3. The method according to claim 2, wherein:

when a quotient between the quantity of the units in the one transmission block and the number of the confirmation information or the number of the granularities is an integer, the receiving end takes the quotient as the quantity of units corresponding to each confirmation information or each granularity; and according to the quantity of units corresponding to each confirmation information or each granularity, the units in the one transmission block are sequentially corresponded to each confirmation information or each granularity from front to back or from back to front to form the confirmation information or the granularities, or, when a quotient between the quantity of the units in the one transmission block and the number of the confirmation information or the number of the granularities is not an integer, the receiving end rounds up the quotient to obtain a first value;

a quantity of units in the one transmission block corresponding to each of at least one of the confirmation information or at least one of the granularities is equal to the first value;

the confirmation information or a granularity with a smaller quantity of units in the one transmission block is located at an end position or an initial position of all the confirmation information or granularities;

or, when a quotient between the quantity of the units in the one transmission block and the number of the confirmation information or the number of the granularities is not an integer, the receiving end rounds down the quotient to obtain a second value;

a quantity of units in the one transmission block corresponding to each of at least one of the confirmation information or at least one of the granularities is equal to the second value;

the confirmation information or a granularity with a larger quantity of units in the one transmission block is located at an end position or an initial position of all the confirmation information or granularities.

4. The method according to claim 3, wherein the receiving end forms the confirmation information or granularities sequentially corresponding to the units in the one transmission block from front to back according to the first value, wherein a quantity of units corresponding to last confirmation information or granularity is smaller than the first value, and the last confirmation information is located at an end position of the confirmation information or granularities of the transmitted data; or, the receiving end forms the confirmation information or granularities sequentially corresponding to the units in the one transmission block from back to front according to the first value, wherein a quantity of units corresponding to first confirmation information or granularity is smaller than the first value, and the first confirmation information is located at an initial position of the confirmation information or granularities of the transmitted data.

5. The method according to claim 3, wherein the receiving end forms the confirmation information or granularities sequentially corresponding to the units in the one transmission block from front to back according to the second value, wherein a quantity of units corresponding to the last confirmation information or granularity is greater than the second value, and the last confirmation information is located at an end position of the confirmation information or granularities of the transmitted data; or, the receiving end forms the confirmation information or granularities sequentially corresponding to the units in the one transmission block from back to front according to the second value, wherein a quantity of units corresponding to first confirmation information or granularity is greater than the second value, and the first confirmation information is located at an initial position of the confirmation information or granularities of the transmitted data.

6. The method according to claim 1, wherein the implicit rule comprises: when the transmitting end transmits the first signaling and the second signaling at the same time, or the first signaling and the second signaling transmitted by the transmitting end are valid at the same time, the transmitting end instructing the receiving end to generate the confirmation information with the number required in the first signaling according to the type of the granularity described in the second signaling; or, when the transmitting end transmits the first signaling, and the type of the granularity is pre-agreed, the transmitting end instructing the receiving end to form the confirmation information with the number required in the first signaling according to the pre-agreed type of the granularity; or, the transmitting end and the receiving end agreeing that the transmitting end directly or indirectly instructs the receiving end to form the confirmation information according to the one transmission block or the code block group in one-time data transmission.

7. The method according to claim 1, wherein the signaling comprises:

a physical layer signaling, wherein the physical layer signaling comprises a downlink control information signaling, and the downlink control information signaling is used for uplink/downlink data scheduling and transmitting; or, a high layer signaling.

8. The method according to claim 1, wherein:
if the high layer signaling is used to transmit the signaling, then the signaling is always valid in a period of validity of the high layer signaling; or,
in the period of validity of the high layer signaling, if the physical layer transmits the signaling, then the signaling transmitted by the physical layer is prevailing; or,
when the high layer signaling is used to transmit the signaling, the physical layer is allowed to change the signaling into this time of data transmission in a period of validity of the signaling;
wherein the signaling comprises the first signaling and/or a second signaling.

9. The method according to claim 1, wherein:
the signaling is that the transmitting end informs the receiving end of a number of members in each of the granularities, or the transmitting end and the receiving end pre-agree on the number of members in each of the granularities, wherein the granularities are in a grouping form, and the grouping form comprises a code block group, and the member comprises a code block; and
the transmitting end and the receiving end pre-agree the type of the granularity or instruct the type of the granularity through the second signaling.

10. A method for processing confirmation information, comprising:
transmitting, by a transmitting end, a signaling to a receiving end; and
after receiving one-time data transmission through one transmission block, forming confirmation information according to the signaling and transmitting the confirmation information to the receiving end, by the transmitting end;
wherein the signaling is configured to instruct the transmitting end to generate confirmation information corresponding to one-time data transmission according to the signaling and in combination with a pre-agreed implicit rule,
wherein the transmitting the signaling and the confirmation information comprises: transmitting the signaling through a high layer signaling, and transmitting the confirmation information through downlink control information; or, transmitting the signaling and the confirmation information through one downlink control information at the same time,
wherein feeding back of the confirmation information for the one-time data transmission is based on a plurality of granularities, and
wherein units in the one transmission block is divided according to a type of a granularity to obtain the plurality of granularities, and one confirmation information is separately formed for each of the plurality of granularities.

11. The method according to claim 10, wherein the implicit rule comprises:
the signaling is a first signaling, wherein the first signaling is configured to generate a number of the plurality of granularities corresponding to one-time data transmission;
if the receiving end receives the first signaling, for one-time data transmission, determining a quantity of units corresponding to each confirmation information or granularity according to a quantity of the units in the one transmission block and the number of the confirmation information or the number of the granularities, so as to receive the confirmation information or the granularities; and
separately forming, by the receiving end, one confirmation information for each granularity;
wherein a unit comprises at least one of followings: a code block, a code block group, and a transmission block.

12. The method according to claim 11, wherein:
when a quotient between the quantity of the units in the one transmission block and the number of the confirmation information or the number of the granularities is an integer, the receiving end takes the quotient as the quantity of units corresponding to each confirmation information or each granularity; and
according to the quantity of units corresponding to each confirmation information or each granularity, the units in the one transmission block are sequentially corresponded to each confirmation information or each granularity from front to back or from back to front to form the confirmation information or the granularities, or,
when a quotient between the quantity of the units in the one transmission block and the number of the confirmation information or the number of the granularities is not an integer, the receiving end rounds up the quotient to obtain a first value;
a quantity of units in the one transmission block corresponding to each of at least one of the confirmation information or at least one of the granularities is equal to the first value;
the confirmation information or a granularity with a smaller quantity of units in the one transmission block is located at an end position or an initial position of all the confirmation information or granularities;
or,
when a quotient between the quantity of the units in the one transmission block and the number of the confirmation information or the number of the granularities is not an integer, the receiving end rounds down the quotient to obtain a second value;
a quantity of units in the one transmission block corresponding to each of at least one of the confirmation information or at least one of the granularities is equal to the second value;
the confirmation information or granularity with a larger quantity of units in the one transmission block is located at an end position or an initial position of all the confirmation information or granularities.

13. A method for processing confirmation information, comprising:
receiving, by a receiving end, a signaling; and
generating confirmation information corresponding to one-time data transmission through one transmission block according to the signaling and in combination with a pre-agreed implicit rule and transmitting the confirmation information, by the receiving end, wherein the receiving, by the receiving end, the signaling comprises:
receiving, by the receiving end, a first signaling, wherein the first signaling is configured to instruct a number of granularities generated by the receiving end corresponding to one-time data transmission;
and/or, receiving, by the receiving end, a second signaling, wherein the second signaling is configured to indicate a type of a granularity used by the receiving end for generating a granularity used for the confirmation information corresponding to the one-time data transmission;

wherein, the type of the granularity comprise at least one of followings: a code block, a code block group, and a transmission block, wherein units in the one transmission block is divided according to the indicated type of the granularity to obtain the indicated number of granularities, and one confirmation information is separately formed for each of the obtained granularities, wherein the signaling is transmitted by a high layer signaling or a physical layer; and the confirmation information comprises HARQ ACK, ACK/NACK.

14. The method according to claim 13, wherein the implicit rule comprises:

if the receiving end receives the first signaling, for one-time data transmission, determining a quantity of units corresponding to each confirmation information or granularity according to a quantity of the units in the one transmission block and the number of the confirmation information or the number of the granularities, so as to form the confirmation information or the granularity; and separately forming, by the receiving end, one confirmation information for each granularity;

wherein a unit comprises at least one of followings: a code block, a code block group, and a transmission block.

15. The method according to claim 14, wherein:

when a quotient between the quantity of the units in the one transmission block and the number of the confirmation information or the number of the granularities is an integer, the quotient is taken as the quantity of units corresponding to each confirmation information or each granularity; and according to the quantity of units corresponding to each confirmation information or each granularity, the units in the one transmission block is sequentially corresponded to each confirmation information or each granularity from front to back or from back to front to form the confirmation information or the granularities, or, when a quotient between the quantity of the units in the one transmission block and the number of the confirmation information or the number of the granularities is not an integer, the quotient is rounded up to obtain a first value;

a quantity of units in the one transmission block corresponding to each of at least one of the confirmation information or at least one of the granularities is equal to the first value;

the confirmation information or granularity with a smaller quantity of units in the one transmission block is located at an end position or an initial position of all the confirmation information or granularities, or, when a quotient between the quantity of the units of in the one transmission block and the number of the confirmation information or the number of the granularities is not an integer, the quotient is rounded down to obtain a second value;

a quantity of units in the one transmission block corresponding to each of at least one of the confirmation information or at least one of the granularities is equal to the second value;

the confirmation information or granularity with a larger quantity of units in the one transmission block is located at an end position or an initial position of all the confirmation information or granularities.

16. The method according to claim 15, wherein the confirmation information or granularities is formed sequentially corresponding to the units in the one transmission block from front to back according to the first value, wherein a quantity of units corresponding to last confirmation information or granularity is smaller than the first value, and the last confirmation information is located at an end position of the confirmation information or granularities of the transmitted data; or, the confirmation information or granularities is formed sequentially corresponding to the units in the one transmission block from back to front according to the first value, wherein a quantity of units corresponding to first confirmation information or granularity is smaller than the first value, and the first confirmation information is located at an initial position of the confirmation information or granularities of the transmitted data.

17. The method according to claim 15, wherein the confirmation information or granularities is formed sequentially corresponding to the units in the one transmission block from front to back according to the second value, wherein a quantity of units corresponding to the last confirmation information or granularity is greater than the second value, and the last confirmation information is located at an end position of the confirmation information or granularities the transmitted data; or, the confirmation information or granularities is formed sequentially corresponding to the units in the one transmission block from back to front according to the second value, wherein a quantity of units corresponding to first confirmation information or granularity is greater than the second value, and the first confirmation information is located at an initial position of the confirmation information or granularities of the transmitted data.

18. The method according to claim 13, wherein the implicit rule comprises:

when the receiving end receives the first signaling and the second signaling at the same time, or the first signaling and the second signaling received by the receiving end are valid at the same time, generating the confirmation information with the number required in the first signaling according to the type of the granularity described in the second signaling; or, when the receiving end receives the first signaling, forming, by the receiving end, the confirmation information with the number required in the first signaling according to a pre-agreed type of a granularity; or, the transmitting end and the receiving end agreeing that the receiving end forms the confirmation information according to the one transmission block or the code block group in one-time data transmission.

19. The method according to claim 13, wherein:

if the signaling received is transmitted by a high layer signaling, then the signaling is always valid in a period of validity of the high layer signaling; or, in the period of validity of the high layer signaling, if a physical layer is used to transmit the data transmission of the signaling received, then the signaling transmitted by the physical layer is prevailing; or, or, when the high layer signaling is used to transmit the signaling, the physical layer is allowed to change the signaling into the present time of data transmission in a period of validity of the signaling;

wherein the signaling comprises the first signaling and/or a second signaling.

20. The method according to claim 13, further comprising:

receiving, by the receiving end, the signaling, the signaling being that the transmitting end informs the receiving end of a number of members in each of the granularities, or the transmitting end and the receiving end pre-agree on the number of members in each of the granularities, wherein the granularities are in a grouping form, and the grouping form comprises a code block group, and the members comprise a code block; and the transmitting end and the receiving end pre-agree the type of the granularity or instruct the type of the granularity through the second signaling.

* * * * *